(12) United States Patent
Li et al.

(10) Patent No.: US 7,986,698 B2
(45) Date of Patent: Jul. 26, 2011

(54) METHODS AND APPARATUS FOR USING CONNECTION IDENTIFIERS HAVING DIFFERENT PRIORITIES AT DIFFERENT TIMES

(75) Inventors: Junyi Li, Bedminster, NJ (US); Rajiv Laroia, Far Hills, NJ (US); Saurabh Tavildar, Jersey City, NJ (US); Xinzhou Wu, Monmouth Junction, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 327 days.

(21) Appl. No.: 12/047,761

(22) Filed: Mar. 13, 2008

(65) Prior Publication Data
US 2009/0232142 A1 Sep. 17, 2009

(51) Int. Cl.
*H04L 12/28* (2006.01)
(52) U.S. Cl. .............. 370/395.3; 370/319; 370/344
(58) Field of Classification Search .............. None
See application file for complete search history.

(56) References Cited

U.S. PATENT DOCUMENTS

| | | | |
|---|---|---|---|
| 7,263,377 B1 | 8/2007 | Wahlstrom et al. | |
| 7,272,400 B1 * | 9/2007 | Othmer | 455/453 |
| 7,577,150 B2 | 8/2009 | Poustchi et al. | |
| 7,599,321 B2 * | 10/2009 | Lee et al. | 370/320 |
| 7,633,863 B2 * | 12/2009 | Kim et al. | 370/230 |
| 2005/0047383 A1 | 3/2005 | Yoshida | |
| 2007/0070943 A1 | 3/2007 | Livet et al. | |
| 2007/0165587 A1 | 7/2007 | Choi | |
| 2008/0113615 A1 * | 5/2008 | Fahldieck | 455/7 |
| 2009/0016219 A1 * | 1/2009 | Laroia et al. | 370/231 |
| 2009/0111479 A1 * | 4/2009 | Yamaguchi et al. | 455/450 |

FOREIGN PATENT DOCUMENTS

JP 2009111929 5/2009

OTHER PUBLICATIONS

International Search Report and Written Opinion—PCT/US09/035190, International Searching Authority—European Patent Office, Sep. 14, 2009.

* cited by examiner

*Primary Examiner* — Chi H Pham
*Assistant Examiner* — Kouroush Mohebbi
(74) *Attorney, Agent, or Firm* — James K. O'Hare

(57) ABSTRACT

Methods and apparatus related to scheduling and/or utilization of air link traffic resources are described. A connection identifier is associated with priority with regard to use of an air link resource, e.g., a peer to peer traffic segment which is in contention. A particular connection may acquire and hold one or multiple connection identifiers. In some embodiments, the priority associated with a particular connection identifier is intentionally varied in a set of traffic slots. In some such embodiments, there is priority randomization from slot to slot. In one such implementation there is a statistically uniform average priority between the different connection identifiers over the recurring structure. Such an implementation facilitates access to traffic segments to a wide range of users, yet allows for differentiation with regard to the amount of access as a function of the number of connection identifiers being held by a particular connection.

21 Claims, 19 Drawing Sheets

| FIGURE 6A |
| FIGURE 6B |

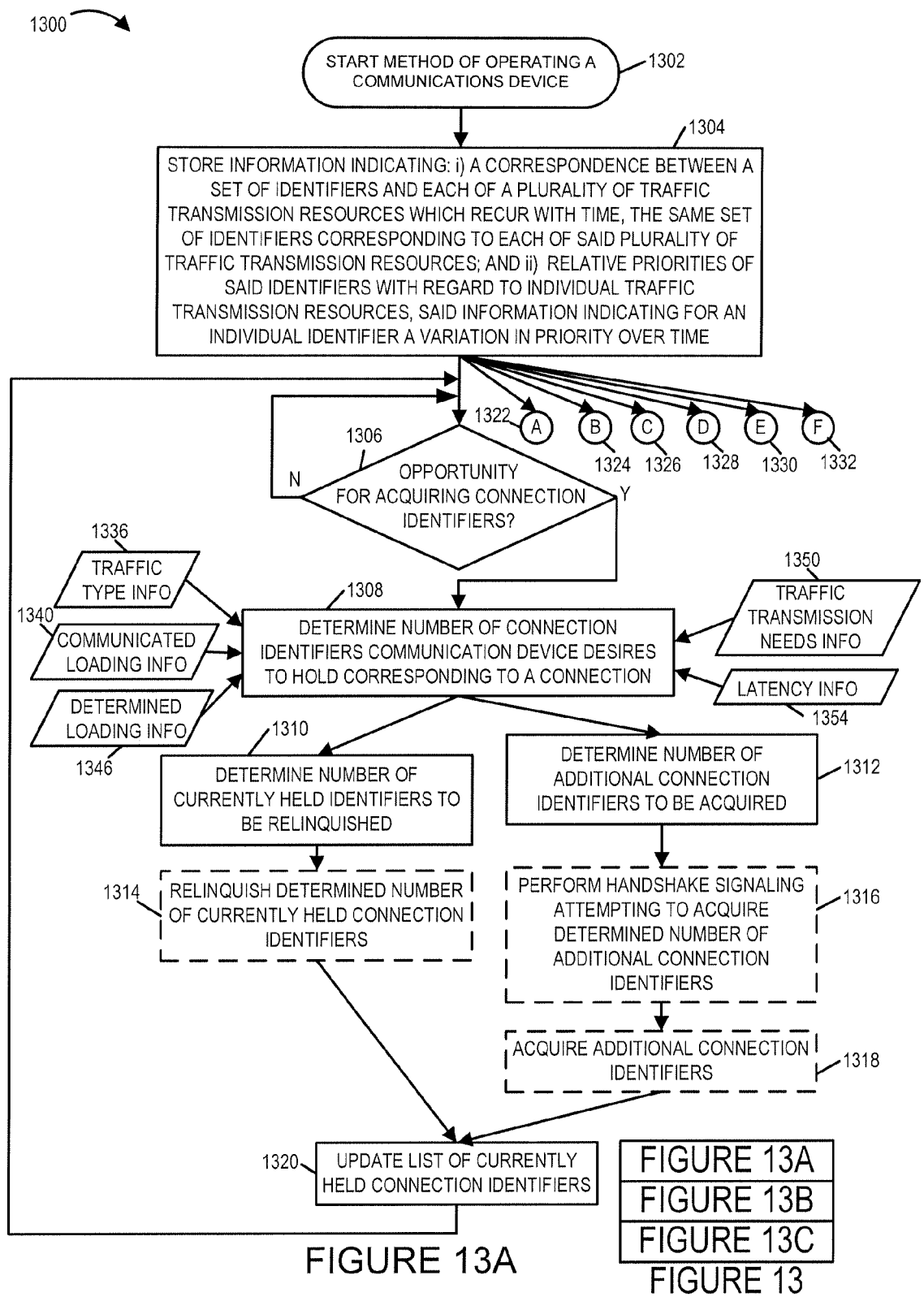

METHODS AND APPARATUS FOR USING CONNECTION IDENTIFIERS HAVING DIFFERENT PRIORITIES AT DIFFERENT TIMES

FIELD

Various embodiments relate to wireless communications, and more particularly, to methods and apparatus for providing different levels of peer to peer communications resources through the use of connection identifiers.

BACKGROUND

Different connections in a wireless network may have different needs in terms of: type of traffic to be communicated, amount of traffic to communicate, priority of the traffic to be communicated, latency requirements, and/or error rate tolerances. In addition, different wireless terminals or users may have purchased different provisioning service level plans from a service provider. Traffic loading conditions can also be expected to vary over time and from one location to another. There is typically a fixed amount of air link resources in a local region available to be scheduled for traffic signaling.

In a peer to peer communications network such as an ad-hoc network, where a centralized control node is not available to monitor activity, establish connections, and perform overall coordination, there is a need for new and innovative methods and apparatus to support the identification of regional activity and establish connections.

In a peer to peer communications network, where boundaries are not clearly defined, one would like to be able to reuse as much of the traffic air link resources as possible in adjacent regions without creating intolerable interference levels. In systems such as ad-hoc peer to peer networks, where there is no centralized scheduling node, it becomes problematic to allocate air link resources, e.g., traffic channel air link resources in an efficient manner.

Compounding the problem of the assignment of a traffic segment in a local region to a particular connection, among which various connections concurrently desire to use the same segment, is the problem that different connections may be associated with different resource needs. Allocating the same fixed amount of resources to each connection, whether it be control resources, e.g., traffic transmission request resources, or traffic transmissions resources, e.g., traffic segments, is inefficient and wasteful.

Based on the above discussion, there is also a need for new and improved methods and apparatus for supporting differentiated qualities of service in a wireless communications system, e.g., in an ad-hoc peer to peer wireless communications system in which scheduling decisions are made in a distributed manner.

SUMMARY

Methods and apparatus related to a wireless communications system supporting the association of multiple connection identifiers with a single connection between a pair of wireless terminals are described. Such methods and apparatus are well suited for peer to peer wireless communications systems, e.g., ad hoc peer to peer wireless communications systems, wherein the assignment of connection identifiers and/or the scheduling of air link resources are performed in a distributed manner.

A connection identifier is associated with priority with regard to use of an air link resource, e.g., a peer to peer traffic segment which is in contention. A particular connection may acquire and hold one or multiple connection identifiers. In some embodiments, the priority associated with a particular connection identifier is intentionally varied in a set of traffic slots. In some such embodiments, there is priority randomization from slot to slot. In one such implementation there is a statistically uniform average priority between the different connection identifiers on average, e.g., on average when considering one iteration of the recurring structure. Such an implementation facilitates access to traffic segments to a wide range of users, yet allows for differentiation with regard to the amount of access as a function of the number of connection identifiers being held by a particular connection.

An exemplary method of operating a communications device, in accordance with some embodiments, comprises: storing information indicating: i) a correspondence between a set of identifiers and each of a plurality of traffic transmission resources which recur with time, the same set of identifiers corresponding to each of said plurality of traffic transmission resources; and ii) relative priorities of said identifiers with regard to individual traffic transmission resources, said information indicating for an individual identifier a variation in priority over time. In some embodiments, the method further comprises transmitting a signal, e.g., a communications request signal, corresponding to one of said connection identifiers, said one of said connection identifiers corresponding to said communications device. In some such embodiments, the communications request signal is communicated on a dedicated request resource, e.g., a dedicated traffic transmission request segment, associated with the connection identifier.

An exemplary communications device, in accordance with some embodiments, comprises: a memory included stored information indicating: i) a correspondence between a set of identifiers and each of a plurality of traffic transmission resources which recur with time, the same set of identifiers corresponding to each of said plurality of traffic transmission resources; and ii) relative priorities of said identifiers with regard to individual traffic transmission resources, said information indicating for an individual identifier a variation in priority over time; and a wireless transmitter module for transmitting a signal corresponding to one of said connection identifiers, said one of said connection identifiers corresponding to said communications device.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

Figure 1:
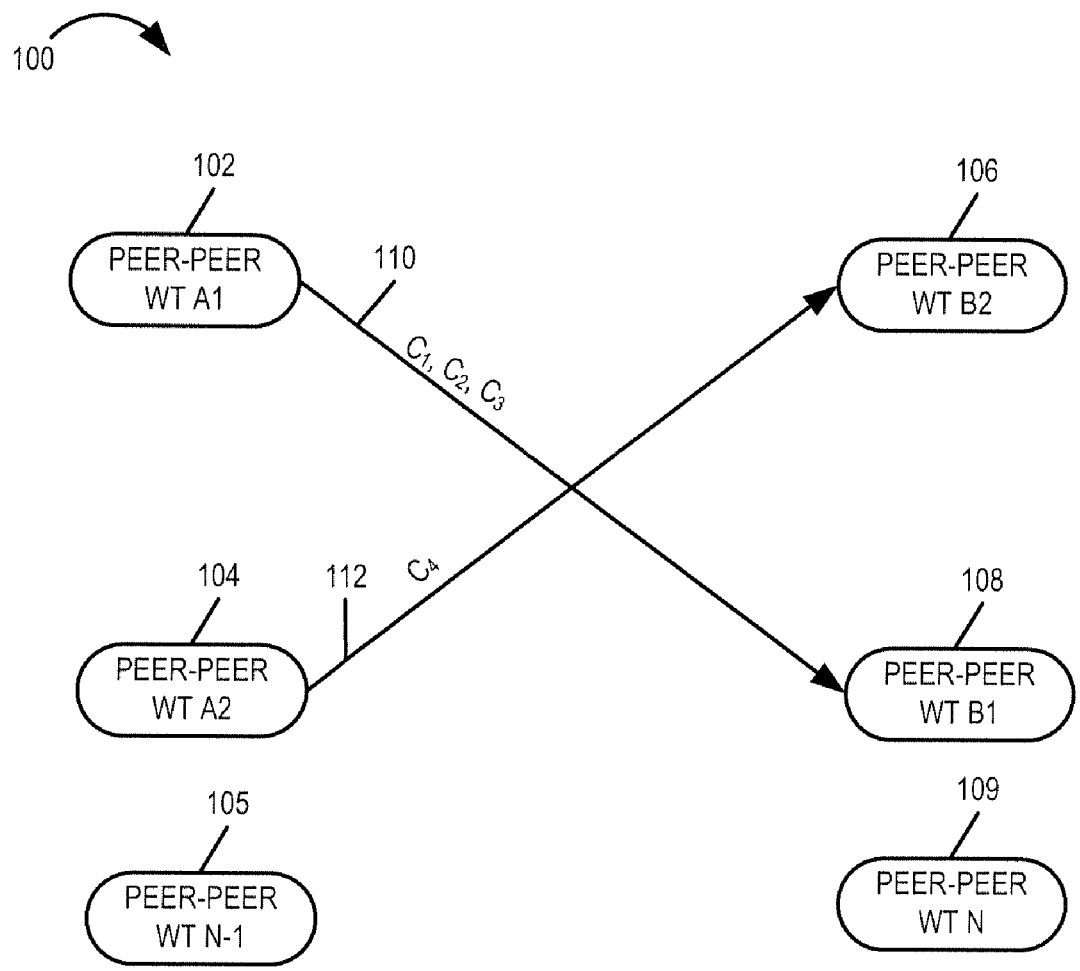
FIG. 1 is a drawing of an exemplary wireless communications system, e.g., an ad hoc peer to peer wireless communications system, in accordance with an exemplary embodiment.

FIG. 1 is a drawing of an exemplary wireless communications system 100, e.g., an ad hoc peer to peer wireless communications system, in accordance with an exemplary embodiment. Exemplary communications system 100 includes a plurality of wireless terminals (peer to peer wireless terminal A1 102, peer to peer wireless terminal A2 104, peer to peer wireless terminal B1 108, peer to peer wireless terminal B2 106, peer to peer wireless terminal N-1 105, . . . , peer to peer wireless terminal N 1109). A wireless terminal may, and sometimes does, establish a connection with another wireless terminal. One or more connection identifiers are associated with a connection between a pair of wireless terminals. As illustrated in FIG. 1, WT A1 102 has a connection 110 with WT B1 108 and the connection 110 is associated with three connection identifiers ($C_1$, $C_2$, $C_3$). WT A2 104 has a connection 112 with WT B2 106, and the connection 112 is associated with a single connection identifier ($C_4$). At a different time different connections are established and maintained between different pairs of wireless terminals. The number of connection identifiers associated with a specific pair of wireless terminal having a connection, in some embodiments, varies over time.

Figure 2:
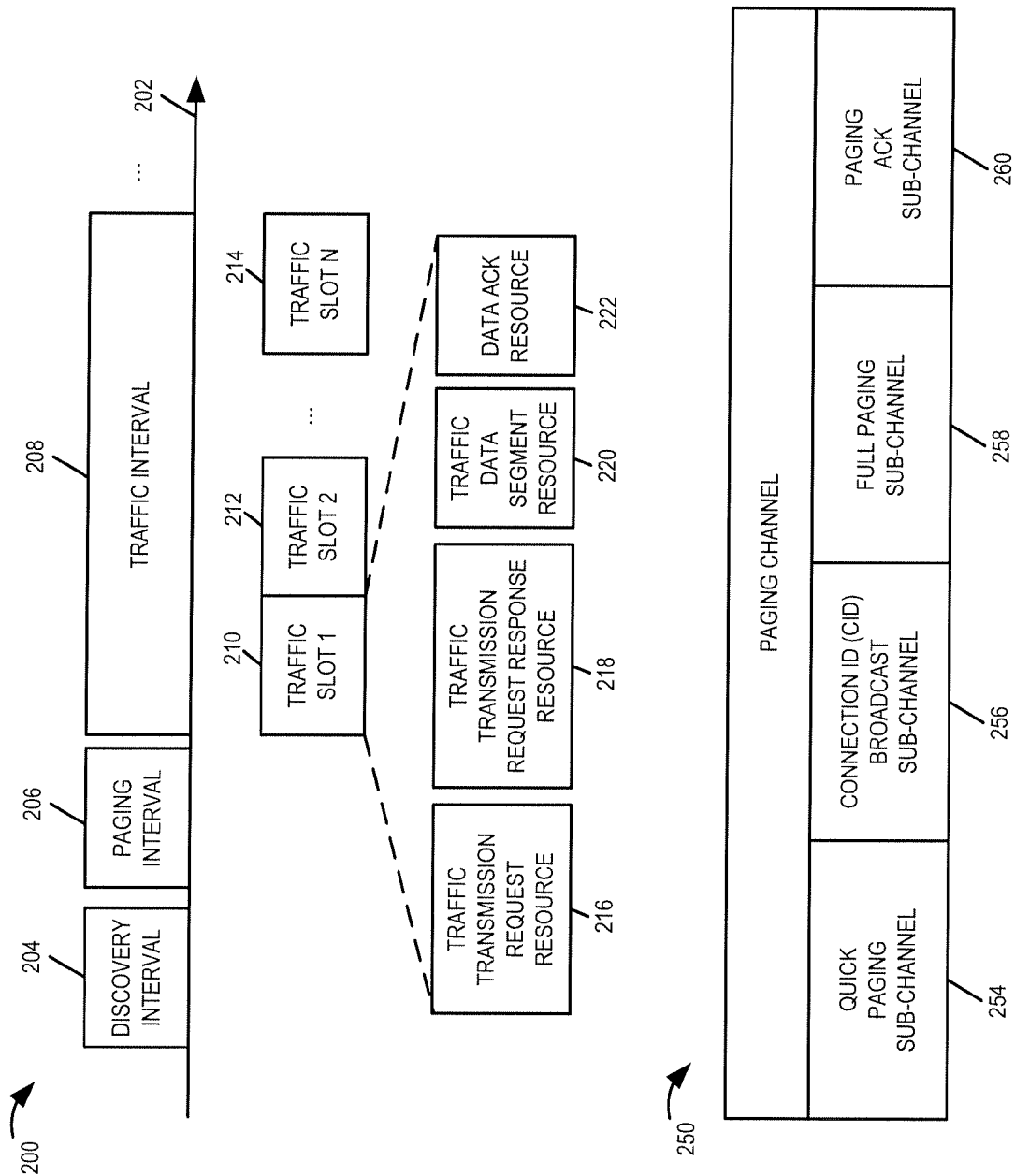
FIG. 2 is a drawing illustrating an exemplary recurring timing structure, associated exemplary air link resources, and channel information.

FIG. 2 is a drawing illustrating an exemplary recurring timing structure, exemplary air link resources and channel information. The structure of FIG. 2 may be applicable to the system of FIG. 1. Exemplary timing structure 200 of FIG. 2 includes a discovery interval 204, a paging interval 206, and a traffic interval 208. During discovery interval 204 a peer to peer wireless terminal transmits a signal to make known its presence in the region, e.g., the peer to peer wireless terminal transmits a beacon signal used for identification, and the peer to peer wireless terminal monitors for identification signals from other peer to peer devices in its vicinity, e.g., other peer to peer beacon signals. In the discovery interval, a wireless terminal forms a list of discovered other wireless terminals in its vicinity.

In paging interval 206 a wireless terminal may, and sometimes does, establish a connection with another wireless terminal with which it would like to communicate traffic signals. In this exemplary embodiment during the paging interval 206, information is communicated using paging channel 250. The paging channel 250 includes a quick paging sub-channel portion 254, a connection ID (CID) broadcast sub-channel portion 256, a full paging sub-channel portion 258 and a paging acknowledgement sub-channel portion 260.

Consider that exemplary WT A has discovered the presence of exemplary WT B during the discovery interval and that WT A seeks to communicate traffic to WT B. WT A sends a paging request signal to WT B using quick paging sub-channel 254 during an interval associated with quick paging. In some embodiments, the quick paging signal is a single tone signal, e.g., a single tone signal based on a discovery ID associated with WT B.

Then, in an interval associated with the CID broadcast sub-channel 256, both WT A and WT B monitor for connection ID signals from other wireless terminals which have current active connections. For example, during the CID broadcast interval, every active connection being used broadcasts a connection identifier. WT A and WT B which have been monitoring for the broadcast CIDs, each prepare a list of CIDs which are in use and then form a list of unused CIDs which are available. Since WT A and WT B are at different locations, and may be subjected to interference from different connections, the list of unused connection identifiers formed by WT A may, and sometimes does, differ from the list of unused connection identifiers that WT B forms. In some embodiments, connection identifiers are MAC identifiers.

WT A identifies a set of potential connection identifiers that it thinks may be suitable for use with WT B. The set of potential connection identifiers includes identifiers which it determined to be unused based on received signals from the CID broadcast. Then, WT A transmits a signal using the full paging sub-channel 258 during an interval associated with full paging, the transmitted signal communicating the generated set of potential connection identifiers. In some embodiments, the full paging signal also communicates information used in determining a number of connection identifiers which are to be associated with the connection. In some such embodiments, the information used in determining a number of connection identifiers is quality of service information. WT B receives the full paging signal from WT A, and forms a set of connection identifier which are to be associated with the connection, members of the set of connection identifiers to be associated with the connection being included in the set of potential connection identifiers communicated via the full paging signal and being also included in WT B's list of unused connection identifiers. Then, WT B generates a paging acknowledgment signal, conveying its list of one or more connection identifiers to be associated with the connection, and transmits the generated signal to WT A using the paging acknowledgment sub-channel 260 during a paging acknowledgment sub-channel interval.

Traffic interval 208 includes a plurality of traffic slots (traffic slot 1 210, traffic slot 2 212, ..., traffic slot N 214). Traffic slot 1 210 includes a traffic transmission request resource 216, a traffic transmission request response resource 218, a traffic data segment resource 220 and a data acknowledgment resource 222. Active connection identifiers include, e.g., connection identifiers for which a CID signal was broadcast using the CID broadcast sub-channel 256 and connection identifiers which were added via paging acknowledgement sub-channel signaling 260. The active connection identifiers are utilized during the traffic interval.

Each of the connection identifiers is associated with a portion of traffic transmission request resource 216, e.g., an OFDM tone-symbol to be used for signaling a request to transmit data using traffic data segment resource. Each of the connection identifiers is associated with a portion of traffic transmission request response resource 218, e.g., an OFDM tone-symbol to be used for signaling an RX echo signal, which is a positive response to a traffic transmission request. Traffic data segment resource 220 is used to carry peer to peer user data traffic signals for a connection, if the transmission request is granted and provided the transmitting device decided not to yield the resource. Data acknowledgement resource 222 is used to carry a traffic data acknowledgment signal in response to traffic data communicated using traffic data segment resource 220.

Figure 3:
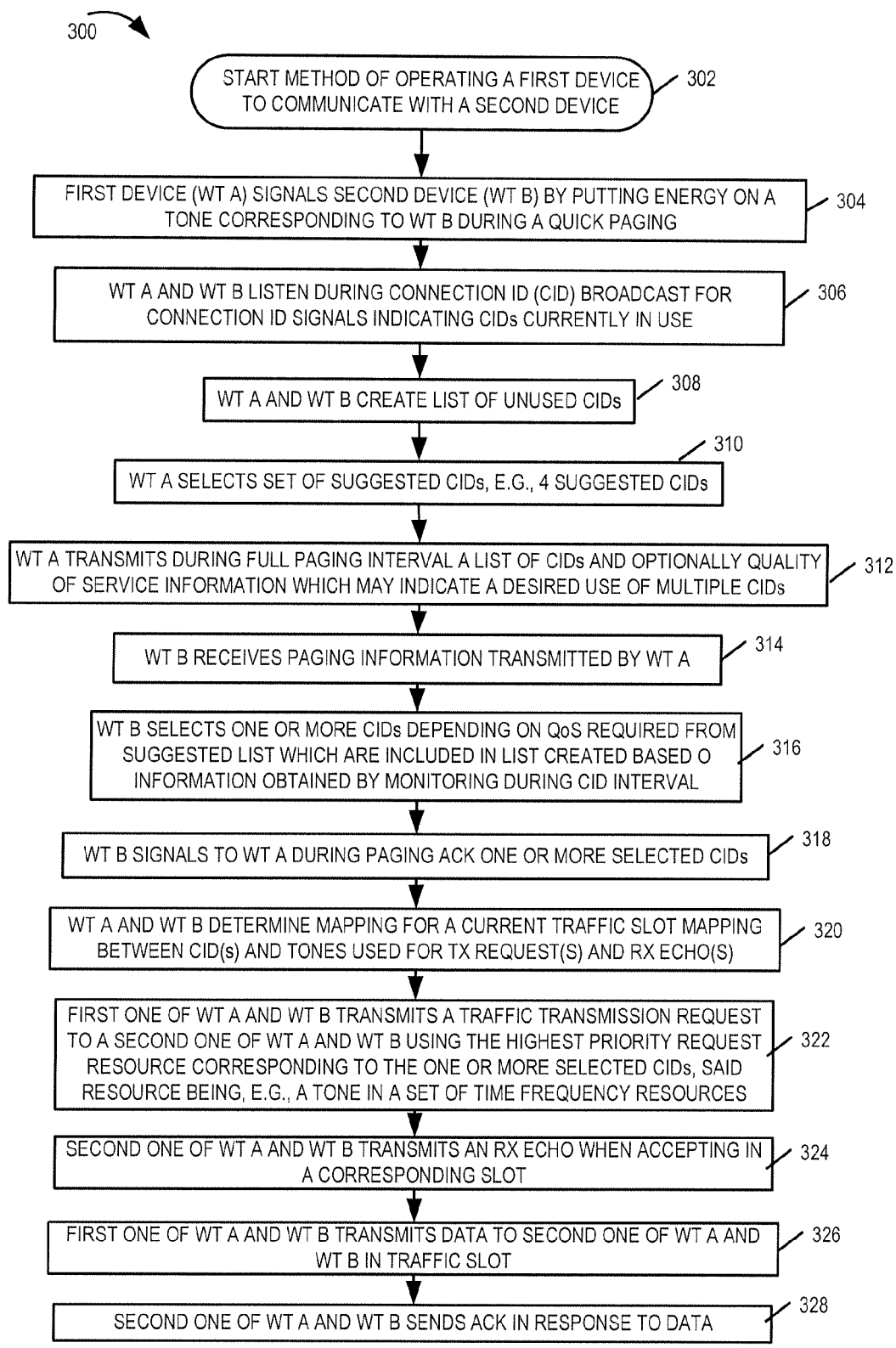
FIG. 3 is a flowchart of an exemplary method of operating a first device to communicate with a second device in accordance with one exemplary embodiment.

FIG. 3 is a flowchart of an exemplary method of operating a first device to communicate with a second device in accordance with one exemplary embodiment. The first device, wireless terminal A, is, e.g., a first peer to peer communications device and the second device, wireless terminal B, is, e.g., a second peer to peer communications device, where WT A and WT B are part of an ad hoc network.

Operation starts in step 302 where the first and second devices are powered on and initialized. The first and second devices (WT A and WT B) synchronize in accordance with a recurring peer to peer timing structure, e.g., the recurring timing structure of FIG. 2. The first and second devices (WT A and WT B) participate in discovery, and the first device (WT A) recognizes that the second device (WT B) is in its vicinity, while the second device (WT B) recognizes that the first device (WT A) is in its vicinity. Consider that the first device (WT A) desires to page the second device (WT B) and establish an active connection. Operation proceeds from step 302 to step 304.

In step 304, the first device (WT A) signals the second device (WT B) by putting energy on a tone corresponding to WT B during quick paging. Consider that WT B recovers the signals and recognizes that it is being paged. Operation proceeds from step 304 to step 306.

In step 306, WT A and WT B listen during a connection identification (CID) broadcast for connection ID signals indicating CIDs which are currently in use. WT A and WT B each make a list of detected active CIDs. Operation proceeds from step 306 to step 308. In step 308 WT A and WT B each create a list of unused connection IDs. WT A and WT B are aware of the set of designated CIDs. WT A forms its list of unused CIDs by removing its detected CIDs (of step 306) from the set of designated CIDs. Similarly, WT B forms its list of unused CIDs by removing its detected CIDs (of step 306) from the set of designated CIDs. It should be noted that WT A and WT B may, and sometimes does arrive at different sets of unused CIDs, since WT A and WT B may be situated at different locations and detect different CID signals. Operation proceeds from step 308 to step 310.

In step 310 WT A selects a set of suggested CIDs of which one or more may be used for a connection between WT A and WT B, the selection being from WT A's list of unused CIDs. For example, in step 308 WT A may have formed a list identifying eight unused CIDs, and in step 310, WT A forms a list identifying at most 4 suggested CIDs from the 8 unused CIDs. In step 310 the WT A generates a full paging interval signal to convey its list of suggested CIDs for the connection between WT A and WT B. In some embodiments, QoS information is included with the list of suggested CIDs in the generated signal. Operation proceeds from step 310 to step 312.

In step 312, WT A transmits during a full paging interval the generated list of suggested CIDs, and optionally includes quality of service information which may indicate a desired use of multiple CIDs. Operation proceeds from step 312 to step 314.

In step 314, WT B receives the paging information transmitted by WT A in step 312. Then, in step 316, WT B selects one or more CIDs depending on the QoS required from the suggested list of CIDs which has been communicated. The selected CIDs are CIDs which are included in both the suggested list of CIDs from WT A and the list of unused CIDs which WT B formed based on received broadcast CIDs detected by WT B during the CID broadcast interval. Operation proceeds from step 316 to step 318.

In step 318, WT B signals to WT A during a paging acknowledgment interval the one or more selected CIDs from step 316. WT B receives the paging acknowledgment signal and identifies the one or more selected CIDs to be used for the connection between WT A and WT B. Operation proceeds from step 318 to step 320.

In step 320, WT A and WT B determine mapping for a current traffic slot between CIDs and tones used for traffic transmission requests and traffic transmission request responses, e.g., RX echos. The mapping between a connection identifier and request/request response resource may, and sometimes does, change from one traffic slot to the next, e.g., in accordance with an implemented hopping pattern known to both WT A and WT B. This hopping provides diversity, e.g., increasing the likelihood that a transmission traffic request corresponding to a connection identifier will have an opportunity to transmit traffic during at least one of the traffic slots in the traffic interval. Priorities are associated with positions within the traffic transmission request resource; therefore, moving a connection identifier to a different traffic transmission request resource tone-symbol from one traffic slot to another, in accordance with hopping, changes request priorities. Operation proceeds from step 320 to step 322.

In step 322 a first one of WT A and WT B transmits a traffic transmission request to a second one of WT A and WT B using the highest priority request resource corresponding to the one or more selected CIDs, said resource used for transmission being a tone in a set of time frequency resources for the duration of an OFDM symbol transmission time interval. Operation proceeds from step 322 to step 324.

In step 324, the second one of WT A and WT B transmits an RX echo signal using an air link resource in a traffic transmission request response interval which corresponds to the request resource. The decision to transmit an RX echo signal represents a decision to accept the received traffic transmission request directed to the second one of WT A and WT B, which was transmitted in step 322. If the second one of WT A and WT B had instead decided not to accept the request, the second one of WT A and WT B would refrain from signaling an RX echo signal. Operation proceeds from step 324 to step 326.

In step 326, the first one of WT A and WT B, which has received the transmitted RX echo of step 324, transmits data to the second one of WT A and WT B in the traffic slot, e.g., using traffic data segment resource 220. Operation proceeds from step 326 to step 328

In step 328, the second one of WT A and WT B, sends an Acknowledgment in response to the received traffic data, e.g., using data ack resource 222.

Note that flowchart 300 has been presented for the case where the decision is to proceed with the establishment of a connection, selection and agreement on one or more connection identifiers to use for the connection is possible and occurs, and traffic transmission request/response signals results in the communications of traffic signals between the first and second wireless devices. Operation may deviate from the positive results flowchart of FIG. 3 based on any of a number of conditions, e.g., no connection identifiers are currently available, there is no overlap between WT A's list of unused connection identifiers and WT B's list of unused connection identifiers, the WT which would like to request a traffic transmission resource decides to refrain from sending a request, e.g., due to a higher priority request which it detected. The WT which is intended to receive the traffic transmission signals decides to perform receiver yielding and not send an RX echo, etc.

Steps 322 to 328, in some embodiments, are performed multiple times, e.g., corresponding to a plurality of traffic slots during which at least one of WT A and WT B desires to transmit traffic signals. For example, the same one or more CIDs signaled from WT B to WT A in step 318 are to be used for the connection between WT A and WT B during a plurality of traffic slots, e.g., (traffic slot 1 210, traffic slot 2 212, . . . , traffic slot N 214).

Figure 4:
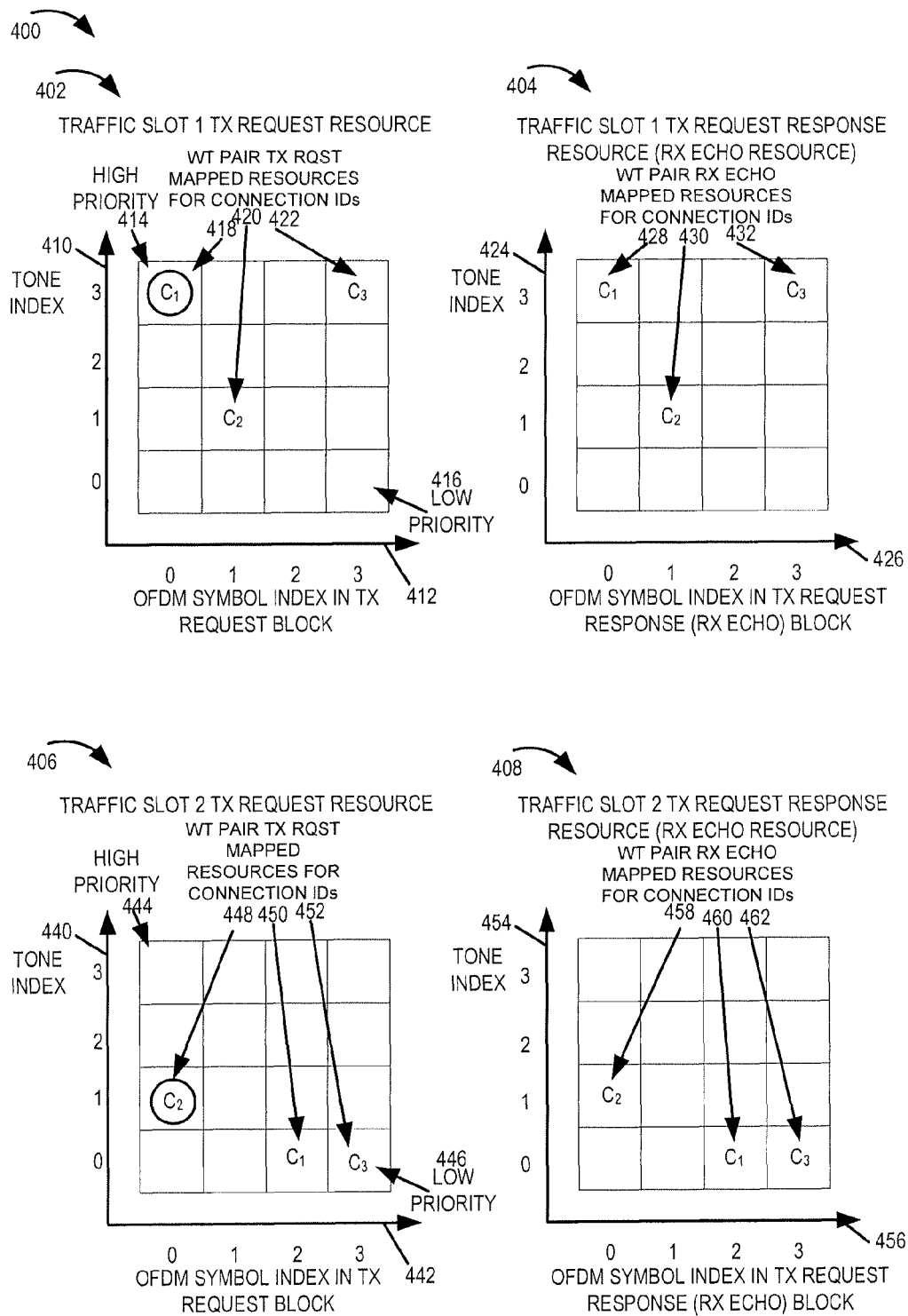
FIG. 4 is a drawing illustrating exemplary connection identifier mapping to air link resources, and the mapping changes between successive traffic slots in accordance with a hopping scheme.

FIG. 4 is a drawing 400 illustrating exemplary connection identifier mapping to air link resources, and the mapping changes between successive traffic slots in accordance with a hopping scheme. In FIG. 4, one may assume that a connection, e.g., between peer to peer WT A and peer to peer WT B has been established, e.g., during a paging interval, and that three connection identifiers ($C_1$, $C_2$, $C_3$) are now associated with the connection.

Drawing 402 illustrates an exemplary traffic slot 1 transmission request resource which includes 16 OFDM tone-symbols, each tone-symbol associated with a connection identifier in accordance with a predetermined mapping. Vertical axis 410 represents tone index, which in this example, ranges from 0 to 3. Horizontal axis 412 represents OFDM symbol index in the transmission request resource block 412, which ranges from 0 to 3. Note that low ranges of tone indexes and symbol indexes are being used for the purposes of illustration; however, the actual number of tones used and/or symbols used may be other than 4. For example, in one exemplary embodiment there are 256 distinct units, e.g., OFDM tone-symbols available in a transmission request resource block to carry requests, e.g., corresponding to 256 different MAC IDs.

In this example, each OFDM tone-symbol of the TX request resource is associated with a different priority level. OFDM tone-symbols corresponding to lower OFDM symbol indexes have higher priority than OFDM tone-symbols corresponding to higher OFDM symbol indexes. For a give OFDM symbol index, an OFDM tone-symbol corresponding to a higher index tone has higher priority than an OFDM tone-symbol corresponding to a lower index tone. OFDM tone-symbol 414 is the tone-symbol having the highest request priority, while OFDM tone-symbol 416 is the tone-symbol having the lowest request priority.

In this example, there are three connection identifiers corresponding to the connection between WT A and WT B, where connection identifier $C_1$ is mapped to OFDM tone-symbol 414, connection identifier $C_2$ is mapped to OFDM tone-symbol 420, and connection identifier $C_3$ is mapped to OFDM tone-symbol 422. It should be noted that of the three connection identifiers $C_1$ is associated with the highest priority, and therefore, if WT A decides to send a traffic transmission request to WT B for traffic slot 1, WT A will use OFDM tone-symbol 414, as indicated by the circle around $C_1$.

Drawing 404 illustrates an exemplary traffic slot 1 transmission request response resource, e.g. an RX echo resource, which includes 16 OFDM tone-symbols, each tone-symbol associated with a connection identifier in accordance with a predetermined mapping. Vertical axis 424 represents tone index, which in this example, ranges from 0 to 3. Horizontal axis 426 represents OFDM symbol index in the transmission request response resource block, which ranges from 0 to 3.

In this example, there are three connection identifiers corresponding to the connection between WT A and WT B, where connection identifier $C_1$ is mapped to OFDM tone-symbol 428, connection identifier $C_2$ is mapped to OFDM tone-symbol 430, and connection identifier $C_3$ is mapped to OFDM tone-symbol 432, which are designated to be used to transmit request response signals, e.g., an RX echo signal from WT B to WT A. For example, consider that WT A has transmitted a traffic transmission request on resource 414 (associated with connection identifier $C_1$), then WT B, if it decides to acquiesce to the request, transmits a RX echo signal on OFDM tone-symbol 428 (associated with connection identifier $C_1$).

Drawing 406 illustrates an exemplary traffic slot 2 transmission request resource which includes 16 OFDM tone-symbols, each tone-symbol associated with a connection identifier in accordance with a predetermined mapping. Vertical axis 440 represents tone index, which in this example, ranges from 0 to 3. Horizontal axis 442 represents OFDM symbol index in the transmission request resource block, which ranges from 0 to 3. Note that low ranges of tone indexes and symbol indexes are being used for the purposes of illustration; however, the actual number of tones used and/or symbols used may be other than 4. In this example, each OFDM tone-symbol of the TX request resource is associated with a different priority level. OFDM tone-symbols corresponding to lower OFDM symbol indexes have higher priority than OFDM tone-symbols corresponding to higher OFDM symbol indexes. For a given OFDM symbol index, an OFDM tone-symbol corresponding to a higher index tone has higher priority than an OFDM tone-symbol corresponding to a lower index tone. OFDM tone-symbol 444 is the tone-symbol having the highest request priority, while OFDM tone-symbol 446 is the tone-symbol having the lowest request priority.

In this example, there are three connection identifiers corresponding to the connection between WT A and WT B, where connection identifier $C_1$ is mapped to OFDM tone-symbol 450, connection identifier $C_2$ is mapped to OFDM tone-symbol 448, and connection identifier $C_3$ is mapped to OFDM tone-symbol 452. It should be noted that of the three connection identifiers $C_2$ is associated with the highest priority, and therefore, if WT A decides to send a traffic transmission request to WT B for traffic slot 2, WT A will use OFDM tone-symbol 448, as indicated by the circle around $C_2$.

Drawing 408 illustrates an exemplary traffic slot 2 transmission request response resource, e.g. an RX echo resource, which includes 16 OFDM tone-symbols, each tone-symbol associated with a connection identifier in accordance with a predetermined mapping. Vertical axis 454 represents tone index, which in this example, ranges from 0 to 3. Horizontal axis 456 represents OFDM symbol index in the transmission request response resource block, which ranges from 0 to 3.

In this example, there are three connection identifiers corresponding to the connection between WT A and WT B, where connection identifier $C_1$ is mapped to OFDM tone-symbol 460, connection identifier $C_2$ is mapped to OFDM tone-symbol 458, and connection identifier $C_3$ is mapped to OFDM tone-symbol 462, which are designated to be used to transmit request response signals, e.g., an RX echo signal from WT B to WT A. For example, consider that WT A has transmitted a traffic transmission request on resource 448 (associated with connection identifier $C_2$), then WT B, if it decides to acquiesce to the request, transmits a RX echo signal on OFDM tone-symbol 458 (associated with connection identifier $C_2$).

Figure 5:
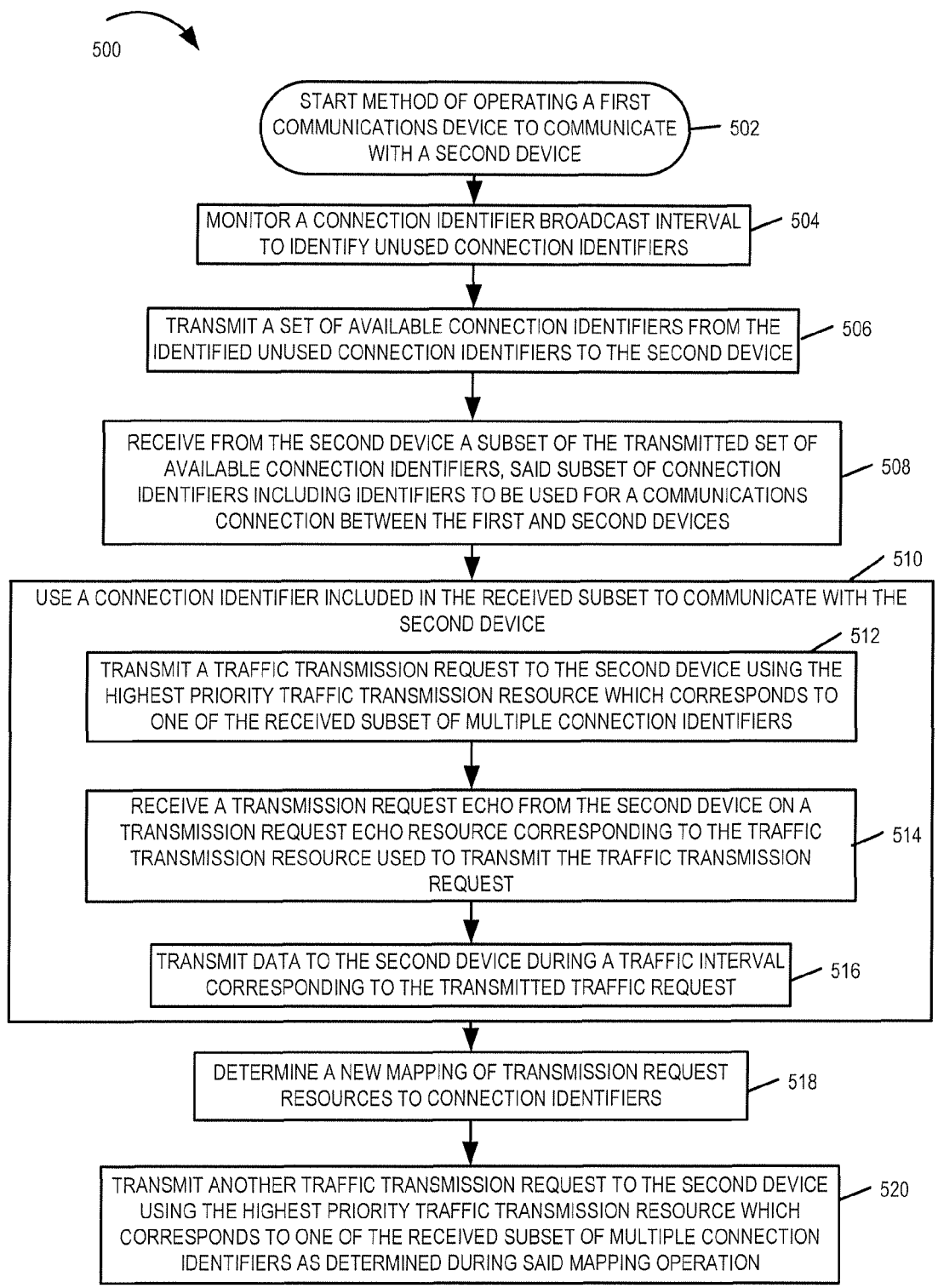
FIG. 5 is a drawing of an exemplary method of operating a first communications device to communicate with a second communications device in accordance with an exemplary embodiment.

FIG. 5 is a drawing of an exemplary method of operating a first communications device to communicate with a second communications device in accordance with an exemplary embodiment. The first and second communications devices are, e.g., peer to peer communications devices, in an ad-hoc peer to peer communications network. Operation of the exemplary method starts in step 502, where the first communications device is powered on and initialized and proceeds to step 504.

In step 504, the first communications device monitors a connection identifier broadcast interval to identify unused connection identifiers. Operation proceeds from step 504 to step 506.

In step 506 the first communications device transmits a set of available connection identifiers from the identified unused connection identifiers to the second device. Then, in step 508 the first device receives from the second device a subset of the transmitted set of available connection identifiers, the subset of connection identifiers including identifiers to be used for a communications connection between the first and second devices. In some embodiments, the connection is a bi-directional connection. The received subset may, and sometimes does, include multiple connection identifiers corresponding to a single communications link between the first and second devices. In some embodiments, different traffic transmission resources are associated with different connection identifiers, the different traffic transmission resources having different priorities. In some embodiments, transmission request resources are tone-symbols in a set of time-frequency resources. Operation proceeds form step 508 to step 510.

In step 510 the first device uses a connection identifier in the received subset to communicate with the second device. Step 510 includes sub-steps 512, 514 and 516. In sub-step 512 the first device transmits a traffic transmission request to the second device using the highest priority traffic transmission request resource which corresponds to one of the received subset of multiple connection identifiers. Operation proceeds from step 512 to step 514. In step 514 the first device receives a transmission request echo from the second device on a transmission request echo resource corresponding to the traffic transmission resource used to transmit the traffic transmission request. Then, in step 516 the first device transmits data to the second device during a traffic interval corresponding to the transmitted traffic request. Operation proceeds from step 510 to step 518.

In step 518 the first device determines a new mapping of transmission request resources to connection identifiers. Then, in step 520 the first device transmits another traffic transmission request to the second device using the highest priority traffic transmission resource which corresponds to one of the received subset of multiple connection identifiers as determined during the mapping operation.

Figures 6, 6A:
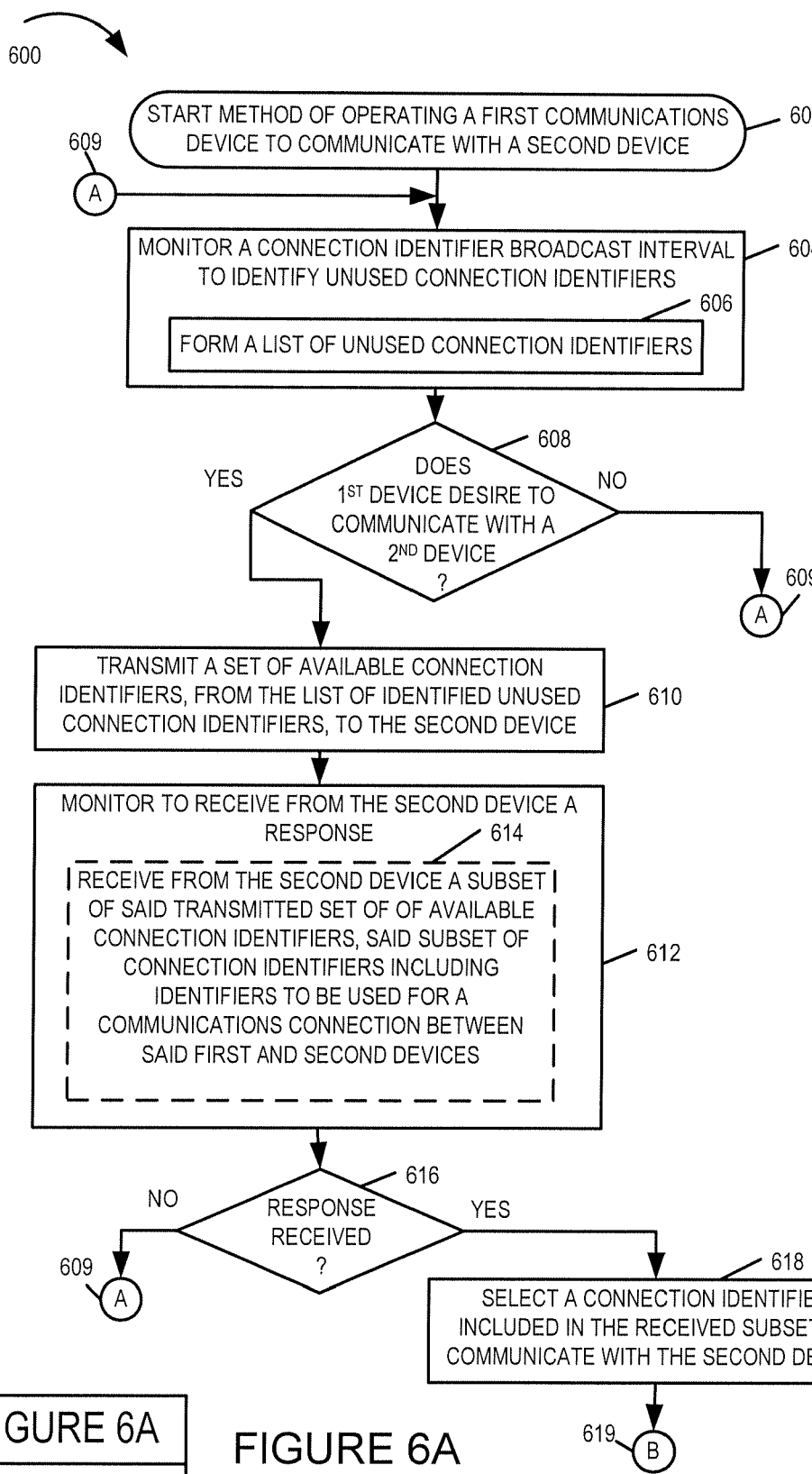
FIG. 6 comprising the combination of FIG. 6A
Figure 6B:
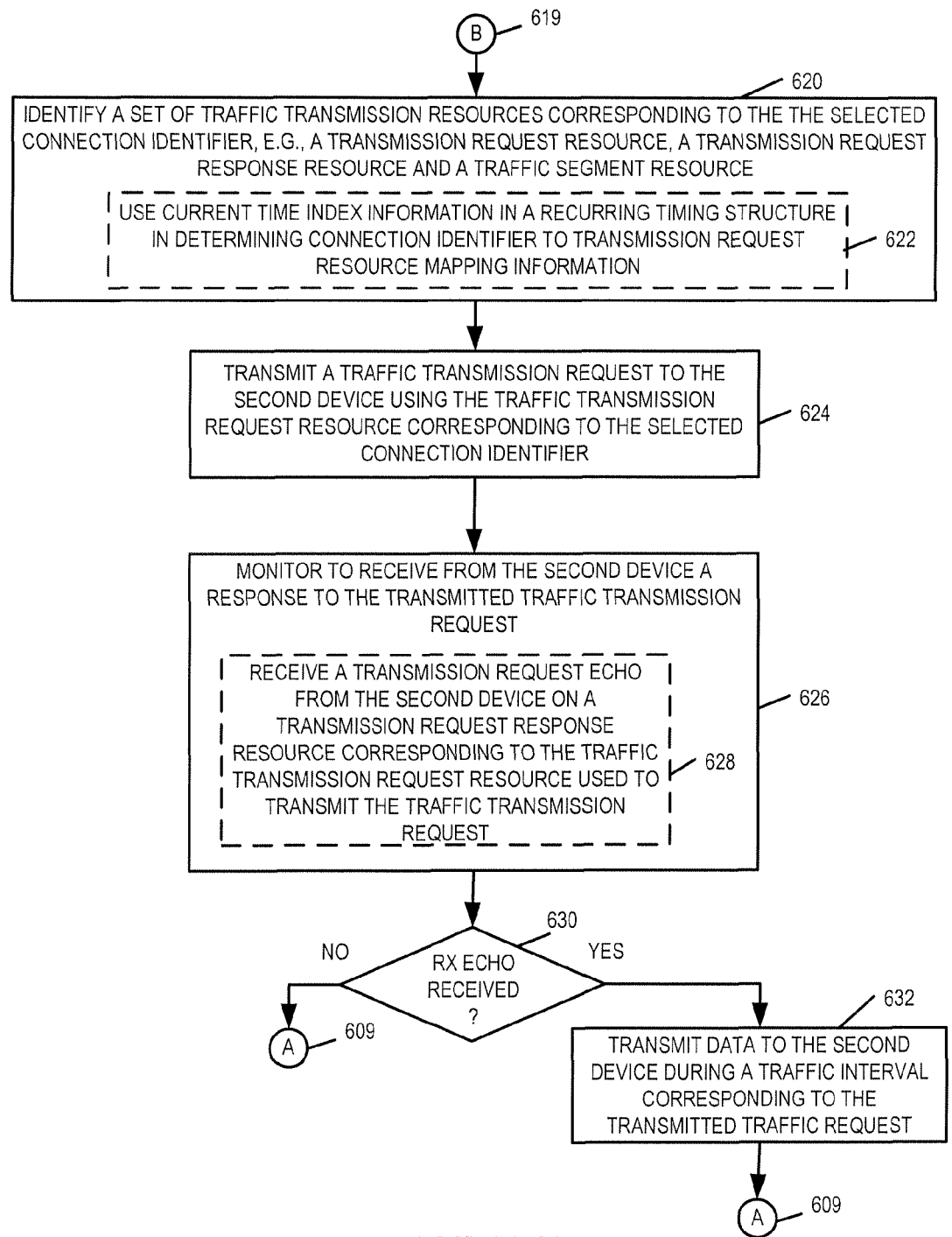
FIG. 6B is a flowchart of an exemplary method of operating a first wireless communications device to communicate with a second wireless communications device.

FIG. 6 comprising the combination of FIG. 6A and FIG. 6B is a flowchart 600 of an exemplary method of operating a first wireless communications device to communicate with a second wireless communications device. The first and second wireless communications devices are, e.g., peer to peer communications devices in an ad-hoc network following a recurring peer to peer timing structure in the network. Operation starts in step 602, where the first communications device is powered on and initialized and proceeds to step 604. In step 604, the first communications device monitors a connection identifier broadcast interval to identify unused connection identifiers. Step 604 includes sub-step 606 in which the first device forms a list of unused connection identifiers. Operation proceeds from step 604 to step 608.

In step 608 the first communications device makes a decision as to whether it desires to communicate with a second communications device. If the first device does not wish to communicate with a second device, then, operation proceeds from step 608 via connecting node A 609 to step 604 for monitoring during the next connection identifier broadcast interval. However, if the first device wishes to communicate with the second device, then operation proceeds from step 608 to step 610.

In step 610, the first device transmits a set of available connection identifiers, from the list of identified unused connection identifiers, to the second device. Then, in step 612, the first communications device monitors to receive a response from the second device. Step 612 includes, at times, sub-step 614, in which the first communications device receives from the second device a subset of the transmitted set of available connection identifiers, said subset of connection identifiers including identifiers to be used for a communications connection between the first and second devices. In some embodiments, the connection is a bi-directional connection. In some embodiments, the received subset may, and sometimes does, include multiple connection identifiers corresponding to a single communications link between the first and second devices. In various embodiments, different traffic transmission resources are associated with different connection identifiers, and the different traffic transmission resources have different priorities. Operation proceeds from step 612 to step 616.

In step 616 the first communications device determines if a response was received from the second device. If a response was not received, then operation proceeds from step 616 via connecting node A 609 to step 604 where the first communications device monitors during the next connection identifier broadcast interval. However, in step 616 if the first communications device determines that a response was received from the second device, then operation proceeds from step 616 to step 618.

In step 618, the first device selects a connection identifier included in the received subset to communicate with the second device. The selected connection identifier is subsequently used to communicate with the second device, e.g., in steps 624, 626 and/or 632. In some embodiments, the connection identifier which is selected, is selected as a function of priority information and corresponds to the highest priority traffic transmission resource of the received subset of multiple connection identifiers. Operation proceeds from step 618 via connecting node B 619 to step 620. In step 620, the first communications device identifies a set of traffic transmission resources corresponding to the selected connection identifier, e.g., a transmission request resource, a transmission request response resource and a traffic segment resource.

In some embodiments, different traffic transmission resources are associated with different connection identifiers, the different traffic transmission resources having different priorities. In some embodiments, transmission request resources are tone-symbols in a set of time-frequency resources. In some embodiments, step 620 includes sub-step 622. In sub-step 622 the first communications device uses current time index information in a recurring timing structure in determining connection identifier to transmission request resource mapping information. Thus mapping of transmission request resources to connection identifiers, in some embodiments, change over time, e.g., to provide diversity.

Operation proceeds from step 620 to step 624. In step 624 the first device transmits a traffic transmission request to the second device using the traffic transmission request resource corresponding to the selected connection identifier. Then, in step 626 the first communications device monitors to receive a response to the transmitted traffic transmission request from the second device. Step 626 may, and sometimes does, include sub-step 628. In sub-step 628 the first communications device receives a transmission request echo from the second device on a transmission request response resource corresponding to the traffic transmission request resource used to transmit the traffic transmission request. Operation proceeds from step 626 to step 630.

In step 630 the first communications device determines if an RX echo signal was received from the second communications device, e.g., communicating a positive response to the traffic transmission request. If an RX echo signal was not received, then operation proceeds from step 630 via connecting node A 609 to step 604 for monitoring during the next connection identifier broadcast interval. However, if an RX echo signal was received, then operation proceeds from step 630 to step 632, in which the first communications device transmits data to second device during a traffic interval corresponding to the transmitted traffic request. Operation proceeds from step 632 via connecting node A 609 to step 604.

Figure 7:
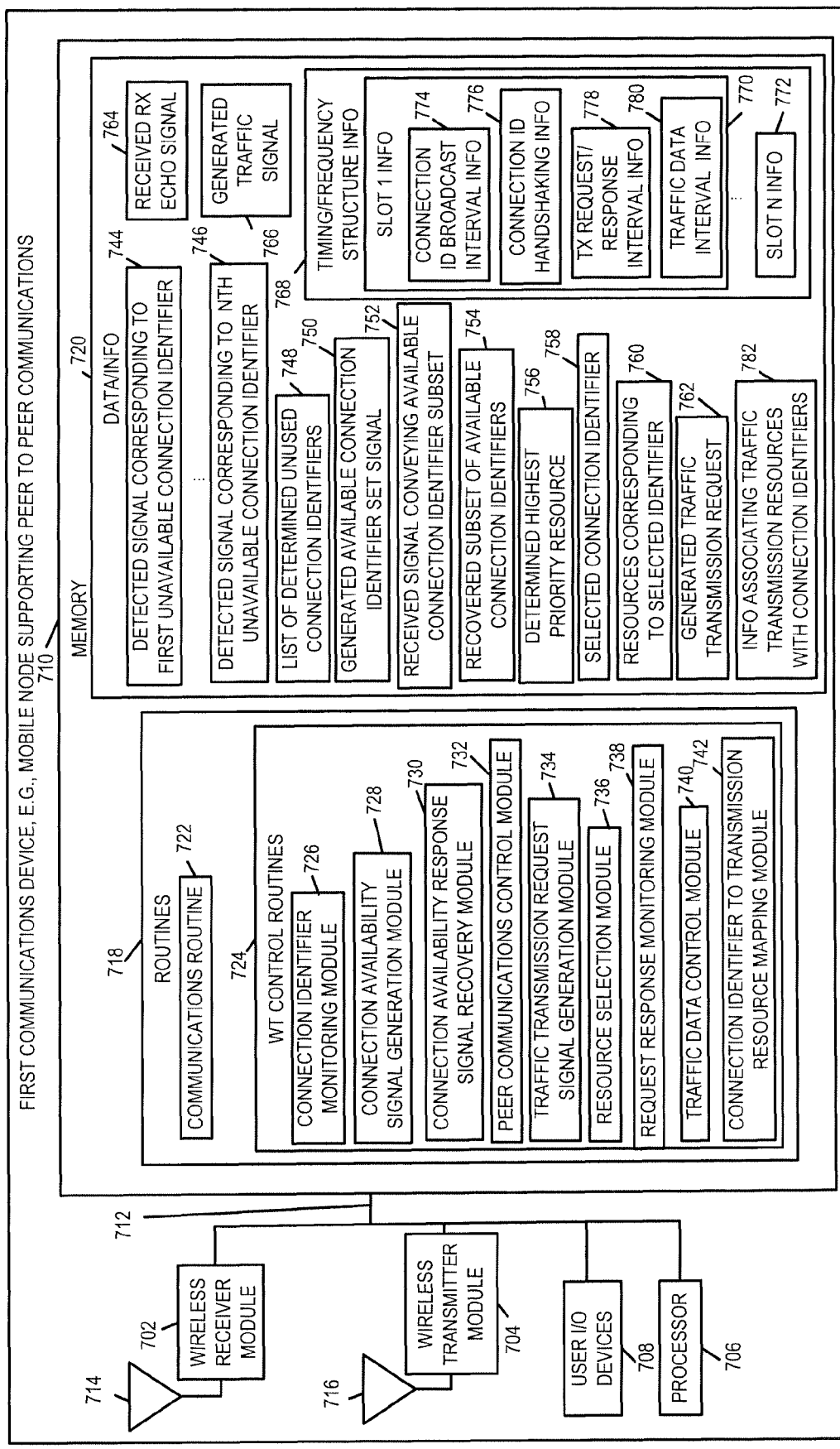
FIG. 7 is a drawing of an exemplary first communications device, e.g., a mobile node supporting peer to peer communications in accordance with an exemplary embodiment.

FIG. 7 is a drawing of an exemplary first communications device, e.g., a mobile node supporting peer to peer communications in accordance with an exemplary embodiment. Exemplary first communications device 700 includes a wireless receiver module 702, a wireless transmitter module 704, user I/O devices 708, a processor 706, and memory 710 coupled together via a bus 712 over which the various elements may interchange data and information.

Memory 710 includes routines 718 and data/information 720. The processor 706, e.g., a CPU, executes the routines 718 and uses the data/information 720 in memory 710 to control the operation of the communications device 700 and implement methods, e.g., the method of flowchart 300 of FIG. 3, the method of flowchart 500 of FIG. 5 or the method of flowchart 600 of FIG. 6.

Wireless receiver module 702, e.g., an OFDM receiver, is coupled to receive antenna 714 via which the communications device 700 receives signals from other peer to peer communications devices. Received signals include, e.g., connection identifier usage signals, e.g., signals 744 and 746, connection availability response signals, e.g., signal 752, and transmission request response signals, e.g., signal 764.

Wireless transmitter module 704, e.g., an OFDM transmitter, is coupled to transmit antenna 716 via which the communications device 700 transmits signals to other peer to communications devices. In some embodiments, the same antenna is used for the receiver and the transmitter. Transmitted signals include connection availability signals, e.g., signal 750, traffic transmission request signals, e.g., signal 762, and traffic signals, e.g., signal 766.

Routines 718 include a communications routine 722 and wireless terminal control routines 724. The communications routine 722 implements the various communications protocols used by the communications device 700. The wireless terminal control routines 724 include a connection identifier monitoring module 726, a connection availability signal generation module 728, a connection availability response signal recovery module 730, a peer communications control module 732, a traffic transmission request signal generation module 734, a resource selection module 736, a request response monitoring module 738, a traffic data control module 740 and a connection identifier to transmission resource mapping module 742.

Data/information includes a plurality of detected signals corresponding to unavailable connection identifiers (detected signal corresponding to a first unavailable connection identifier 744, ..., detected signal corresponding to an Nth unavailable connection identifier 746), a list of determined unused connection identifiers 748, a generated available connection identifier set signal 750, a received signal conveying available connection identifier subset information 752, a recovered subset of available connection identifiers 754, a determined highest priority resource 756, a selected connection identifier 758, information identifying resources corresponding to the selected identifier 760, a generated traffic transmission request signal 762, a received RX echo signal 764, and a generated traffic signal 766. Data/information 720 also includes information associating traffic transmission resources with connection identifiers 782 and timing/frequency structure information 768. The timing frequency structure information 768 includes information corresponding to a plurality of intervals in a recurring timing structure (slot 1 information 770, ..., slot N information 772). Slot 1 information 770 includes connection ID broadcast interval information 774, connection ID handshaking interval information 776, TX request/response interval information 780 and traffic data interval information 780. In some embodiments, the slot 1 information 770 includes information identifying and/or defining multiple TX request/response/traffic data interval sets corresponding to a single connection ID broadcast interval/connection ID handshaking interval pair. Thus established and agreed upon connection IDs are, in such an embodiment, used for multiple successive traffic slots in a traffic interval.

Connection identifier monitoring module 726 detects signals received during a connection identifier broadcast interval and determines unused connection identifiers. Connection identifier monitoring module 726 determines a set of available connection identifiers including connection identifiers indicated by signals received during the connection identifier broadcast interval to be unused connection identifiers. Detected signal corresponding to first unavailable connection identifier 744 and detected signal corresponding to N unavailable connection identifier are signal detected by connection identifier monitoring module 726 while list of determined unused connection identifiers 748 is an output of connection identifier monitoring module 726.

Connection availability signal generation module 728 generates a signal conveying information identifying a set of available connection identifiers. List of determined unused connection identifiers 748 is an input to connection availability signal generation module 728 while generated available connection identifier set signal 750 is an output of module 728.

Connection availability response signal recovery module 730 identifiers a subset of available connection identifiers from a signal received from the communications device to which the generated available connection identifier set signal was communicated. Received signal conveying available connection identifier subset 752 is an input to connection availability response signal recovery module 730, while recovered subset of available connection identifiers 754 is an output of module 730. In various embodiments, the subset includes, at times, multiple connection identifiers corresponding to a single communications link between the first communications device and a second communications device.

Peer communications control module 732 uses a connection identifier included in the received subset identified by information 754 to communicate with a second device, e.g., the device which transmitted the subset, over a connection. In various embodiments, the connection is a bi-directional connection.

Resource selection module 736 selects to use the highest priority traffic transmission resource which corresponds to one of the received subset of multiple connection identifiers. For example, each of the connection identifiers of the subset is associated with a different traffic transmission request resource and the different traffic transmission request resources are associated with different priorities. The resource selection module 736 selects the highest priority traffic transmission resource corresponding to a member of the subset for transmission of the request. This selection also by virtue of the linkage between transmission traffic request resources and connection identifiers also selects a connection identifier. Determined highest priority resource 756 and selected connection identifier 758 are outputs of the resource selection module 736.

Traffic transmission request signal generation module 734 generates a traffic transmission request to another device, e.g., to a second device. Generated traffic transmission request 762 is an output of module 734. The generated traffic transmission request is communicated using the traffic transmission request resource, e.g., OFDM tone-symbol, identified by determined highest priority resource 756 and corresponding to selected connection identifier 758.

Request response monitoring module 738 monitors a transmission request response resource to detect the reception of a transmission request response signal, e.g., an RX echo signal, from the device to which the request was transmitted. For example, corresponding to the request resource which conveyed the traffic transmission request, there is a corresponding request response resource. If the device to which the request was sent, e.g., the second device, acquiesces to the request it responds by transmitting an RX echo signal using that request response resource. However, if it des not acquiesce to the request then it does not transmit an RX echo signal. Received RX echo signal 764 is a signal detected by request response monitoring module 738, e.g., signifying that the first wireless device 700 may proceed with the traffic signaling.

Traffic data control module 740 controls the transmitter module 704 to transmit data to another device, e.g., the second device, during a traffic interval corresponding to a transmitted traffic request, e.g., a transmitted traffic request for which an RX echo signal was received. Generated traffic signal 766, e.g., a peer to peer traffic signal communicating user data such as text data, audio data and/or image data, is transmitted by wireless transmitter module 704 under the direction of traffic data control module 740.

Connection identifier to transmission resource mapping module 742 determines a mapping of transmission resources including transmission request resources to connection identifiers as a function of time. Thus connection identifier to transmission resource mapping module 742 determines a mapping of transmission request resources to connection identifiers for a first time interval and for a second time interval, the first and second time intervals being different, and the mapping between request resources and connection identifiers changing between first and second time intervals. Connection identifier to transmission resource mapping module 742 uses stored information associating traffic transmission resources with connection identifiers 782 and timing/frequency structure information 768 in determining the mappings.

Connection ID broadcast interval information 774 identifies a time interval for which the connection identifier monitoring module 726 operates. Connection ID handshaking interval information 776 identifies an interval during which a connection availability signal and a connection availability response signal are communicated. TX request/response interval information 778 identifies an interval during which a transmission traffic request signal and an RX echo signal are communicated. Traffic interval information 780 identifies an interval during which a traffic signal, e.g., a peer to peer traffic signal, is communicated.

Figure 8:
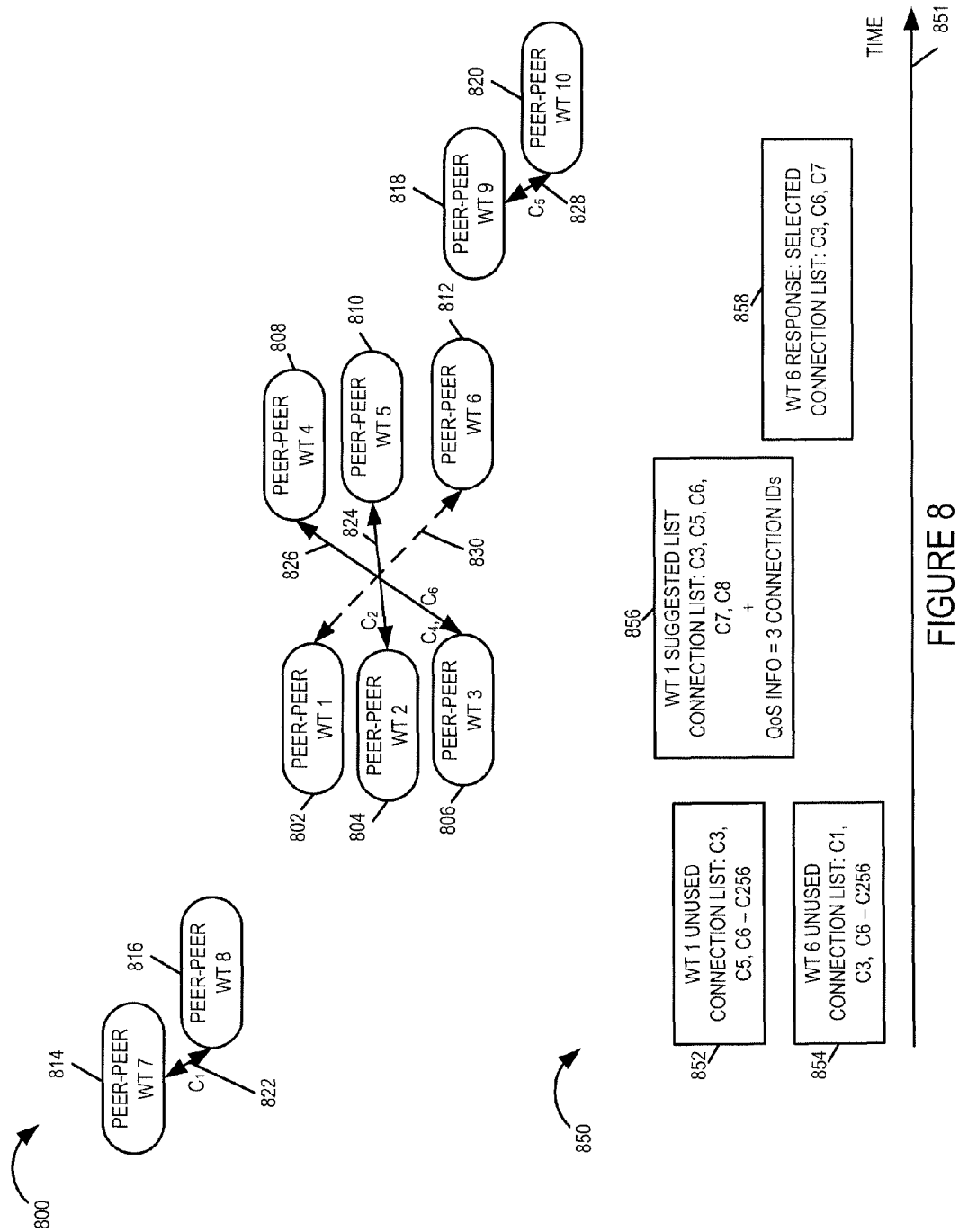
FIG. 8 is drawing illustrating various aspects of connection identifier assignment in accordance with one exemplary embodiment.

FIG. 8 is drawing illustrating various aspects of connection identifier assignment in accordance with one exemplary embodiment. In FIG. 8 exemplary peer to peer wireless communications system 800 includes a plurality of peer to peer wireless terminals (WT 1 802, WT 2 804, WT 3 806, WT 4 808, WT 5 810, WT 6 812, WT 7 814, WT 8 816, WT 9 818, WT 10 820). The WTs of FIG. 8 are, e.g., WTs in accordance with WT 700 of FIG. 7 and/or in accordance with the method of flowchart 300 of FIG. 3, flowchart 500 of FIG. 5 and/or flowchart 600 of FIG. 6. Active connections exist between four pairs of the wireless terminals. Connection 824 exists between WT 2 804 and WT 5 810, and the connection is associated with one connection identifier, $C_2$. Connection 826 exists between WT 3 806 and WT 4 808, and the connection is associated with two connection identifiers, $C_4$ and $C_6$. Connection 822 exists between WT 7 814 and WT 8 816, and the connection is associated with one connection identifier, $C_1$. Connection 828 exists between WT 9 818 and WT 10 820, and the connection is associated with one connection identifier, $C_5$. During a connection identifier broadcast interval, wireless terminals corresponding to existing active connections broadcast their connection identifier information.

In this example, WT 1 802 and WT 6 812, which are aware of the presence of each other, desire to establish a connection, which is represented by dotted line 830. Drawing 850 illustrates various operations performed to reach agreement on the connection identifier or identifiers to be used for the connection. Axis 851 illustrates time. During the connection identifier broadcast interval, both WT 1 802 and WT 6 812 have been monitoring, and identify detected connection identifiers. Since WT 1 and WT 6 are at different locations, they may detect different connection identifiers in use. In this embodiment, there are a set of 256 different connection identifiers which can assigned. WT 1 and WT 6 each form a list of unused connection identifiers from their perspective. Block 852 indicates the WT 1 unused connection list is: $C_3$, $C_5$, and $C_6$-$C_{256}$. Block 854 indicates the WT 6 unused connection list is: $C_1$, $C_3$, and $C_6$-$C_{256}$. In this example, WT 1 happens to initiate the connection request to WT 6, forms a suggested connection list, generates a signal communicating the suggested list and quality of service information, and communicates the generated signal to WT 6. The quality of service information is used to derive the number of connection identifiers to be assigned to the connection. Block 856 indicates that the WT 1 suggested connection list is: $C_3$, $C_5$, $C_6$, $C_7$, $C_8$ and the QoS information indicates that WT 1 would like 3 connection identifiers to be assigned. WT 6 receives the signal conveying the suggested list of connection identifiers to be used and quality of service information, and processes the received signal. WT 6 selects three connection identifiers from the suggested list which are also included in its unused connection list 854. WT 6 generates a response signal communicating the selected list of connection identifiers to be used for the connection, and transmits the signal to WT 1. Block 858 indicates the selected connection list includes $C_3$, $C_6$ and $C_7$. WT 1 receives the list of suggested connection identifiers.

WT 1 and WT 6 use the list of selected connection identifiers for operations with their connection 830, e.g., identifying resources which have been allocated to connection such as transmission request resources, corresponding transmission request response resources, and traffic transmission resources for peer to peer traffic transmission operations. Those identified resources are used by WT 1 and WT 6 in the communication of peer to peer traffic signals.

Figure 9:
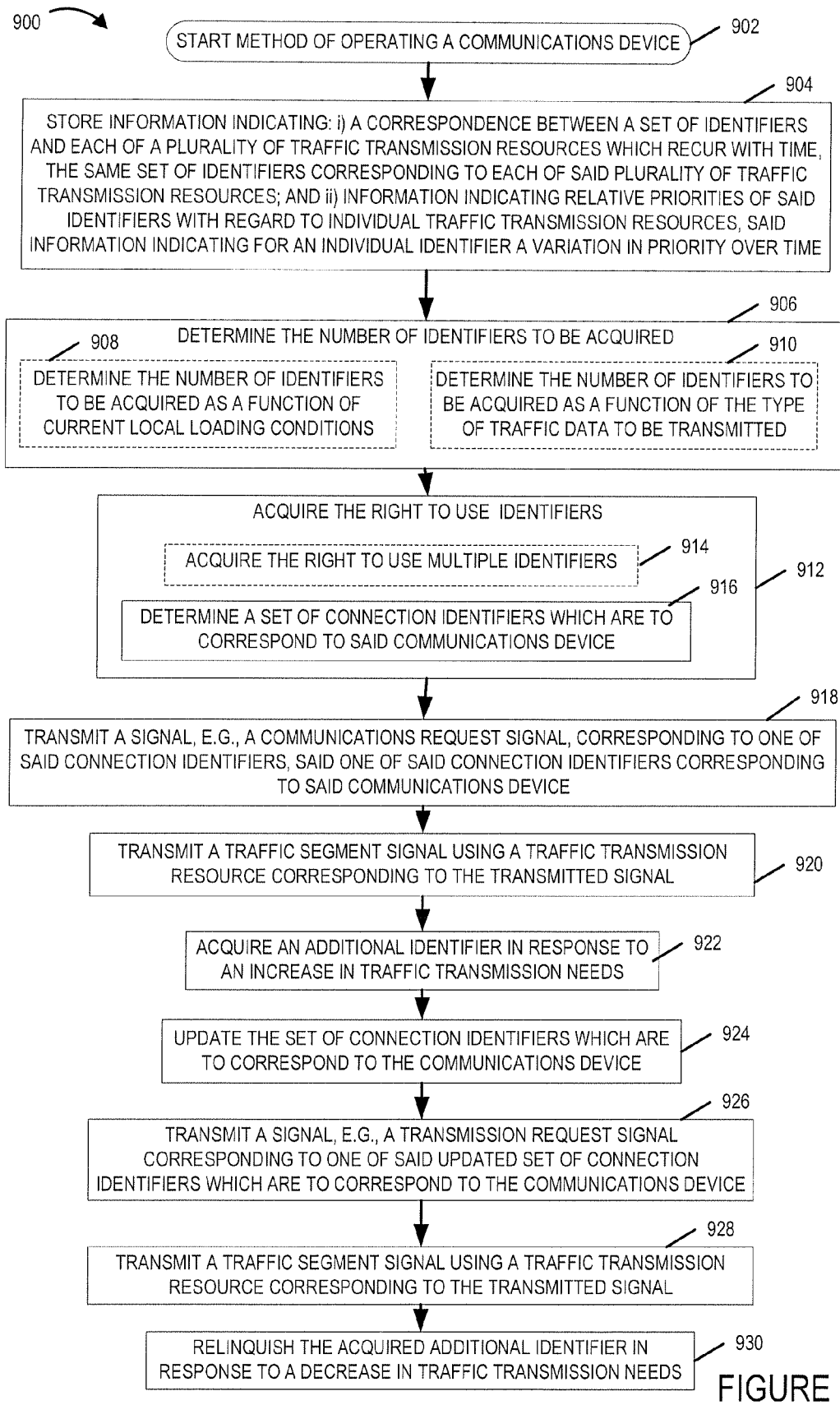
FIG. 9 is a flowchart of an exemplary method of operating a communications device, e.g., a peer to peer communications device, in accordance with an exemplary embodiment.

FIG. 9 is a flowchart 900 of an exemplary method of operating a communications device, e.g., a peer to peer communications device, in accordance with an exemplary embodiment. Operation starts in step 902 and proceeds to step 904. In step 904, the communications device stores information indicating: i) a correspondence between a set of identifiers and each of a plurality of traffic transmission resources which recur with time, the same set of identifiers corresponding to each of said plurality of traffic transmission resources; and ii) relative priorities of said identifiers with regard to individual traffic transmission resources, said information indicating for an individual identifier a variation of priority over time. For example, the plurality of traffic transmission resources which recur with time is a plurality or ordered traffic transmission segments in a recurring peer to peer timing structure; corresponding to a given segment, each identifier within the set of identifiers has a different predetermined priority, and the priority associated with a particular identifier is different for at least some traffic transmission segments within the recurring structure. In some embodiments, the average priority provided to multiple different individual identifiers over time is substantially the same. Operation proceeds from step 904 to step 906.

In step 906 the communications device determines the number of identifiers to be acquired. Step 906 includes one or more of sub-steps 908 and 910. In sub-step 908, the communications device determines the number of identifiers to be acquired as a function of current loading conditions. In sub-step 910, the communications device determines the number of identifiers to be acquired as a function of the type of traffic data to be transmitted. Operation proceeds from step 906 to step 912.

In step 912 the communications device acquires the right to use identifiers. At times step 912 includes sub-step 914 in which the communications device acquires the right to use multiple identifiers. At different points in time, the communications device may, and sometimes does, acquire different numbers of identifiers. In some embodiments, for a given amount of data to be transmitted more identifiers are acquired during periods of high traffic loading than during periods of low traffic loading, wherein the total amount of data transmitted in the local area during high traffic loading periods is greater than during low traffic loading periods. In some embodiments, for a given amount of data to be transmitted, more identifiers are acquired during periods of more stringent latency requirements than during periods of low latency requirements. Step 912 includes sub-step 916 in which the communications device determines a set of connection identifiers which correspond to the communications device. Operation proceeds from step 912 to step 918.

In step 918, the communications device transmits a signal, e.g., a communications request signal, corresponding to one or said connection identifiers corresponding to the communications device. The communications request signal is, e.g., a request to communicate using the traffic transmission resource corresponding to a request resource on which the communications request signal was transmitted. In various embodiments, the request resource is a resource dedicated to one of the connection identifiers. For example, for an individual traffic transmission segment, each connection identifier has its own dedicated request resource which it may use to transmit a traffic transmission request signal.

Operation proceeds from step 918 to step 920, in which the communications device transmits a traffic segment signal using a traffic transmission resource corresponding to the transmitted signal. Operation proceeds from step 920 to step 922.

In step 922, the communications device acquires an additional identifier in response to an increase in traffic transmission needs, and then in step 924 the communications device updates the set of connection identifiers which are to correspond to the communications device. Operation proceeds from step 924 to step 926. In step 926, the communications device transmits a signal, e.g., a traffic transmission request signal corresponding to one of said updated set of connection identifiers which are to correspond to the communications device. Operation proceeds from step 926 to step 928. In step 928, the communications device transmits a traffic segment signal using a traffic transmission resource corresponding to transmitted request signal of step 926. Operation proceeds from step 928 to step 930. In step 930, the communications device relinquishes the acquired additional identifier in response to a decrease in traffic transmission needs.

Figure 10:
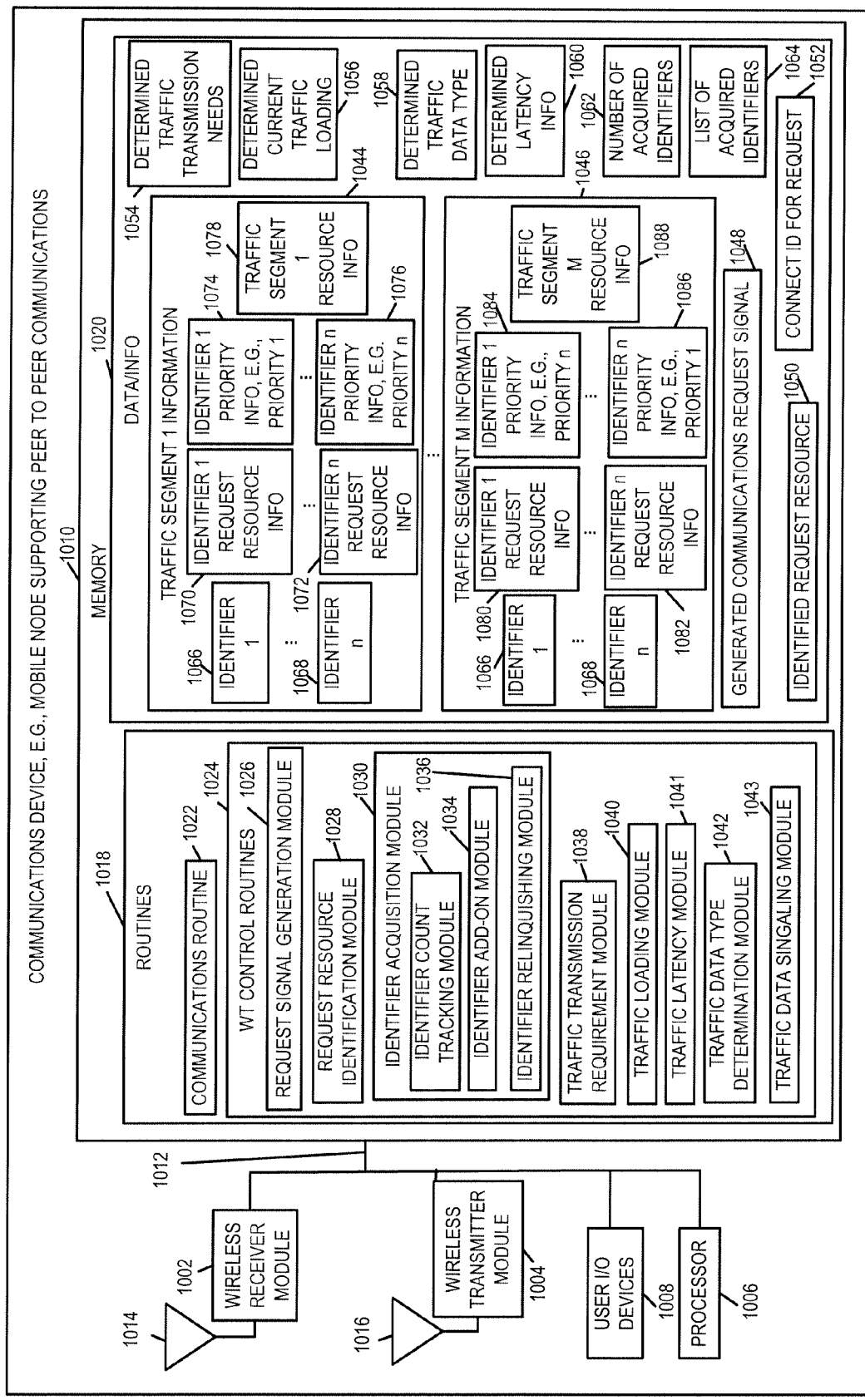
FIG. 10 is a drawing of an exemplary communications device in accordance with an exemplary embodiment.

FIG. 10 is a drawing of an exemplary communications device 1000 in accordance with an exemplary embodiment. Exemplary communications device 1000, e.g., a mobile node supporting peer to peer communications, includes a wireless receiver module 1002, a wireless transmitter module 1004, a processor 1006, user I/O devices 1008 and a memory 1010 coupled together via a bus 1012 over which the various elements may interchange data and information. Memory 1010 includes routines 1018 and data/information 1020. The processor 1006, e.g., a CPU, executes the routines 1018 and uses the data/information 1020 in memory 1010 to control the operation of the communications device 1000 and implement methods, e.g., the method of flowchart 900 of FIG. 9 or the method of flowchart 1300 of FIG. 13.

Wireless receiver module 1002, e.g., an OFDM receiver, is coupled to receive antenna 1014 via which the communications device 1000 receives signals from other communications devices. Received signals include, e.g., traffic loading signals, connection identifier acquisition handshaking signals, communications request signals, communications request response signals, and traffic signals.

Wireless transmitter module 1004, e.g., an OFDM transmitter, is coupled to transmit antenna 1016 via which the communications device 1000 transmits signals to other communications devices. In some embodiments, the same antenna is used for the transmitter and receiver. Transmitted signals include, e.g., connection identifier acquisition handshaking signals, communications request signals, communications request response signals, and traffic signals. Wireless transmitter module 1004 is for transmitting a communications request signal corresponding to one of a set of connection identifiers, wherein said one of the set of connection identifiers currently corresponds to the communications device 1000. The communications request signal is a request to communicate using the traffic transmission resource corresponding to a request resource on which the communications request signal was transmitted. For example, consider that the communications device 1000 wants to transmit traffic signals using the transmission segment identified by traffic segment 1 resource information 1078, and that communications device 1000 currently has acquired a set of connection identifiers including identifier 1 1066, communications device 1000 may send a communications request signal using the dedicated request segment identified by identifier 1 request resource information 1070.

Routines 1018 includes communications routine 1022 and wireless terminal control routines 1024. The communications routine 1022 implements the various communications protocols used by the communications device 1000. Wireless terminal control routines 1024 include a request signal generation module 1026, a request resource identification module 1028, an identifier acquisition module 1030, a traffic transmission requirement module 1038, a traffic loading module 1040, a traffic latency module 1041, a traffic data type determination module 1042 and a traffic data signaling module 1043.

Data/information 1020 includes a plurality of traffic segment information corresponding to a plurality of traffic segments in a recurring timing structure (traffic segment 1 information 1044, . . . , traffic segment M information 1046), a generated communications request signal 1048, an identified request resource 1050, information identifying the connection identifier corresponding to the generated communications request 1052, determined traffic transmission needs 1054, determined current traffic loading 1056, determined traffic data type information 1058, determined latency information 1060, information storing the number of acquired identifiers 1062, and a list of the acquired identifiers 1064.

Traffic segment 1 information 1044 includes a set of identifiers (identifiers 1 1066, . . . , identifier n 1068), resource information corresponding to the identifiers (identifier 1 request resource information 1070, . . . , identifier N request resource information 1072), respectively, corresponding identifier priority information (identifier 1 priority information 1074, e.g., indicating priority 1, . . . , identifier n priority information 1076, e.g., indicating priority n), respectively, and traffic segment 1 resource information 1078. Traffic segment M information 1046 includes the set of identifiers (identifiers 1 1066, . . . , identifier n 1068), resource information corresponding to the identifiers (identifier 1 request resource information 1080, . . . , identifier N request resource information 1082), respectively, corresponding identifier priority information (identifier 1 priority information 1084, e.g., indicating priority n, . . . , identifier n priority information 1086, e.g., indicating priority 1), respectively, and traffic segment M resource information 1088. It should be noted that corresponding to an individual connector identifier, its priority is different corresponding to different traffic segments. In this example, the average priority provided to multiple different individual identifiers over time is substantially the same.

Request signal generation module 1026 generates a communications request signal, e.g., signal 1048. The communications request signal 1048 is, e.g., a communications request to use a peer to peer traffic segment. Request resource identification module 1028 is for identifying the request resource on which the communications request signal is to be communicated. Identified request resource 1050 is an output of module 1028. For example, consider that the request signal 1048 is a request to use the traffic segment identified by information 1078 and the connection identifier selected to carry the request is identifier 1 1066, then request resource identifier module 1028 identifies that the request resource, e.g., dedicated request segment, in the recurring timing structure, to be used to carry the request is identified by information 1070. In this example, it may be observed that each request resource is a resource dedicated to one of the set of connection identifiers, e.g., a dedicated request segment associated with a connection identifier.

The identifier acquisition module 1030 includes an identifier count tracking module 1032, an identifier add-on module 1034 and an identifier relinquishing module 1036. Identifier acquisition module 1030 is for acquiring the right of communications device 1000 to use connection identifiers, and the identifier acquisition module 1030 supports acquiring the right to use multiple identifiers. The identifier acquisition module 1030 supports acquiring the right to use different numbers of identifiers at different points in time. Identifier acquisition is performed, in this embodiment, in a decentralized manner with device 1000 exchanging identifier acquisition handshaking signals with a peer device with which it desires to establish a connection or has an existing connection.

Identifier count tracking module 1032 tracks the number and designation of the acquired identifiers to be used by the communications device 1000. Number of acquired identifiers 1062 and list of acquired identifiers 1064 are outputs of module 1032.

Traffic transmission requirement module 1038 is for determining the communication device's traffic transmission needs. Determined traffic transmission needs 1054 is an output of module 1038. The identifier acquisition module 1030 uses determined traffic needs information 1054 as an input. In one example, the identifier add-on sub-module 1034 acquires an additional identifier in response to an increase in traffic transmission needs. As another example, the identifier relinquishing module 1036 relinquishes an acquired identifier in response to a decrease in traffic transmission needs.

Traffic loading module 1040 determines current local traffic loading. Determined current traffic loading information 1056 is an output of module 1040 which is used as an input by identifier acquisition module 1030. In some embodiments, the identifier acquisition module 1030 determines the number of identifiers to be acquired as a function of the current local traffic loading. In various embodiments, the identifier acquisition module 1030 determines the number of identifier to be acquired or relinquished as a function of a change in local loading conditions. In some embodiments, for a given amount of data to be transmitted by communications device 1000 more identifiers are acquired during periods of high traffic loading than during periods of low traffic loading, the total amount of data transmitted in the local area during high traffic loading periods being greater than during low traffic loading periods.

Traffic latency module 1041 determines latency information corresponding to anticipated traffic communications. Determined latency information 1060 is an output of module 1041 and an input to identifier acquisition module 1030. In some embodiments, for a given amount of data to be transmitted, more identifiers are acquired for use during periods of anticipated more stringent latency requirements than for periods of low latency requirements.

Traffic data type determination module 1042 is for determining the type of traffic data to be transmitted, e.g., voice traffic, interactive gaming traffic, live video and/or audio streaming traffic, time insensitive data file traffic, etc. Determined traffic data type information 1058 is an output of module 1042 and an input to identifier acquisition module 1030. In various embodiments, the identifier acquisition module 1030 identifies the number of identifiers to be acquired as a function of the type of traffic data to be transmitted.

In some embodiments, the local traffic loading is determined by recovering and processing a signal conveying loading information. For example, the loading signal is broadcast by an external node, e.g., a fixed point node such as a base station in the vicinity to be used by communications devices in its vicinity. In another embodiment, communications device 1000 monitors signaling activity of other device in its local vicinity, e.g., corresponding to other peer to peer connections, and determines an estimate of current loading in its local vicinity.

Traffic data signaling module 1043 generates traffic signals, e.g., peer to peer traffic signals, and controls the wireless transmitter module 1004 to transmit the generated traffic signals on the appropriate traffic segment resource corresponding to the transmitted request signal which was preciously transmitted and for which an affirmative communications request response signal was received. Traffic data signaling module 1043 also controls the receive module 1002 to receive traffic signals on a traffic segment resource corresponding to a received communications request for which it had previously transmitted a positive communications request response signal, and then recovers traffic data from the receive signal, e.g., peer to peer traffic signals intended for communications device 1000.

Figure 11:
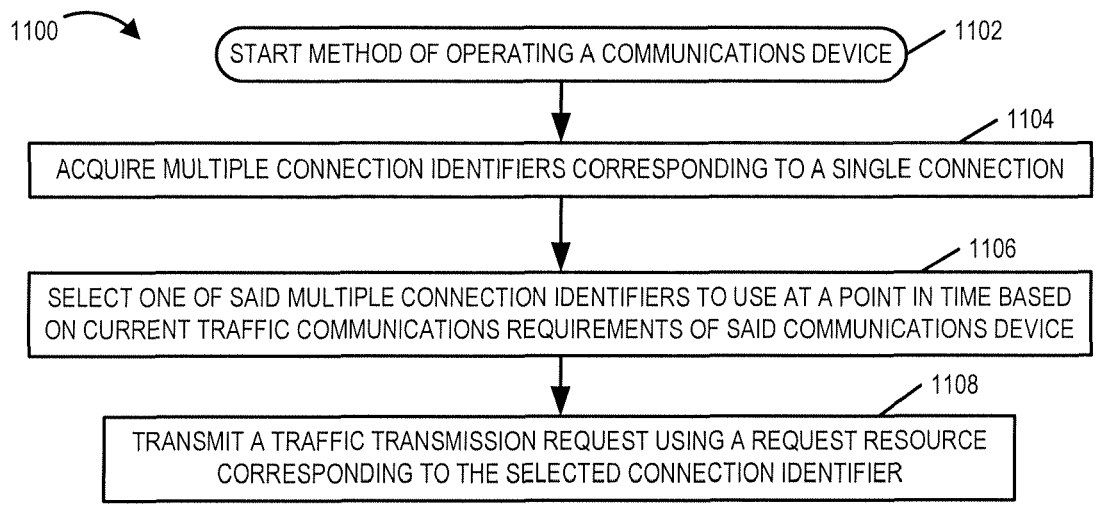
FIG. 11 is a flowchart of an exemplary method of operating a communications device in accordance with an exemplary embodiment.

FIG. 11 is a flowchart 1100 of an exemplary method of operating a communications device in accordance with an exemplary embodiment. The communications device is, e.g., a peer to peer communications device which has, at times, multiple connection identifiers corresponding to a single connection. Operation starts in initial step 1102, where the communications device is powered on and initialized and proceeds to step 1104. In step 1104, the communications device acquires multiple connection identifiers corresponding to a single connection. Then in step 1106 the communications device selects one of the multiple connection identifiers to use at a point in time based on current traffic communications requirements of the communications device. In some embodiments, selecting one of multiple connection identifiers includes selecting the connection identifier based on the type of traffic to be transmitted at a given point in time. In various embodiments, selecting one of the multiple connection identifiers includes selecting the connection identifier based on the type of traffic to be transmitted at a give point in time. In some embodiments, a connection identifier having a lower priority is selected when non-voice data is to be transmitted than when voice data is to be transmitted. In some embodiments, a connection identifier is randomly selected when only non-voice data is to be transmitted. In some embodiments, a connection identifier having the highest priority is selected when voice data is to be transmitted. In some embodiments, a latency requirement is considered when selecting the one of said multiple connection identifiers. In some embodiments, when voice data is to be communicated but the latency requirement indicates that immediate transmission is not required, a connection identifier having a lower priority than another connection identifier assigned to the communications device is selected.

Operation proceeds from step 1106 to step 1108. In step 1108 the communications device transmits a traffic transmission request using a request resource corresponding to the selected connection identifier.

Figure 12:
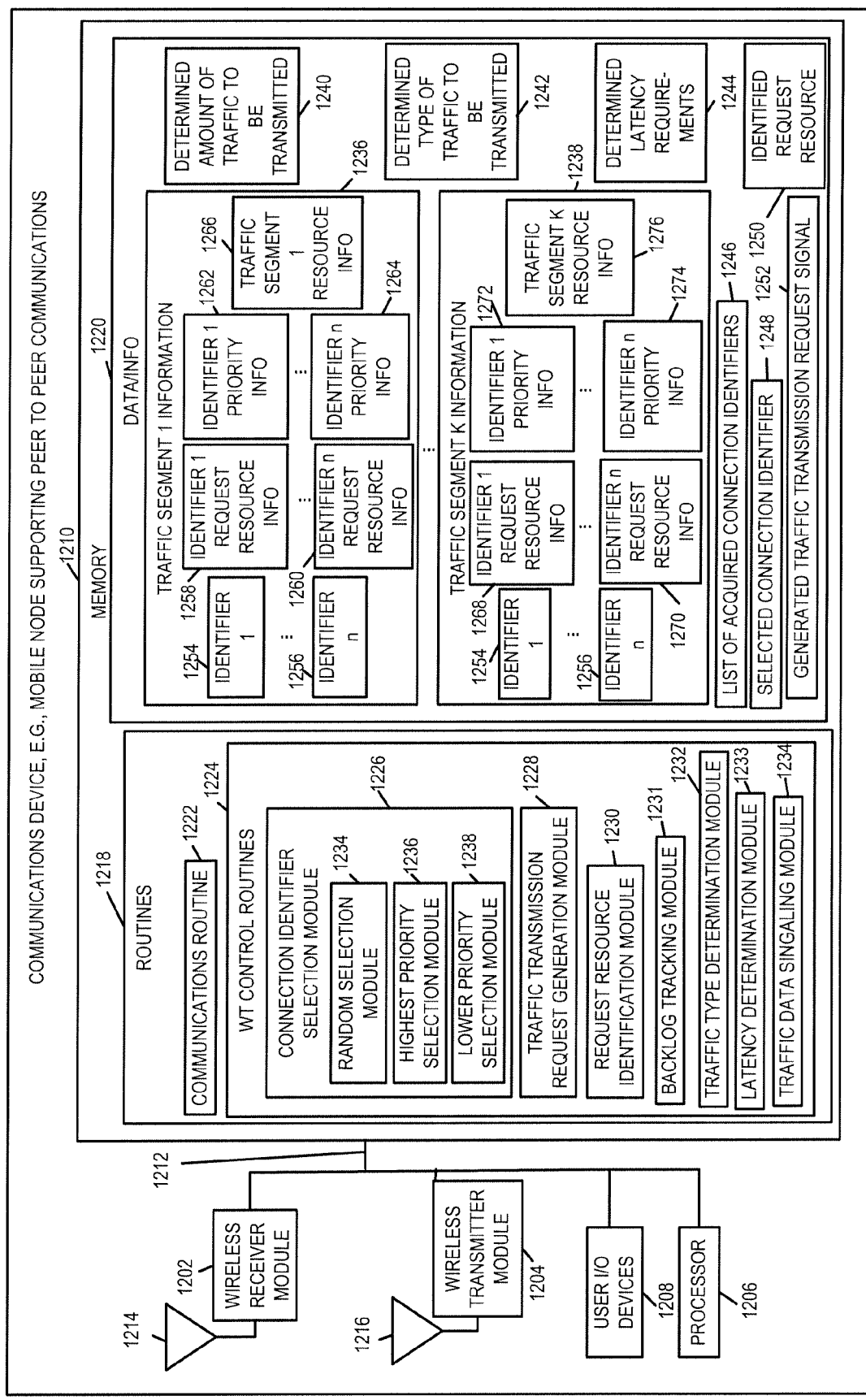
FIG. 12 is a drawing of an exemplary communications device, e.g., a mobile node supporting peer to peer communications in accordance with an exemplary embodiment.

FIG. 12 is a drawing of an exemplary communications device 1200, e.g., a mobile node supporting peer to peer communications in accordance with an exemplary embodiment. Communications device 1200 has, during some time intervals, multiple connection identifiers corresponding to a single connection, the multiple connection identifiers having different transmission resource priorities. Exemplary communications device 1200 includes a wireless receiver module 1202, a wireless transmitter module 1204, a processor 1206, user I/O devices 1208 and a memory 1210 coupled together via a bus 1212 over which the various elements may interchange data and information. Memory 1210 includes routines 1218 and data/information 1220. The processor 1206, e.g., a CPU, executes the routines 1218 and uses the data/information 1220 in memory 1210 to control the operation of the communications device 1200 and implement methods, e.g., the method of flowchart 1100 of FIG. 11.

Wireless receiver module 1202, e.g., an OFDM receiver, receives signals from other communications devices. Received signals include, e.g., handshaking signals used in acquiring a set of connection identifiers, traffic transmission request signals, traffic transmission request response signals and traffic signals.

Wireless transmitter module 1204, e.g., an OFDM transmitter, transmits signals to other communications devices. Transmitted signals include, e.g., handshake signaling using in acquiring a set of connection identifiers, traffic transmission request signals, traffic transmission request response signals, and traffic signals.

User I/O devices 1208 include, e.g., a microphone, a keyboard, a keypad, switches, a camera, a speaker, a display, etc. User I/O device 1208 allow a user of communications device 1200 to input data/information, access output data/information, and control at least some function of the communications device 1200.

Routines 1218 include a communications routine 1222 and wireless terminal control routines 1224. The communications routine 1222 implements the various communications protocols used by the communications device 1200. The wireless terminal control routines 1224 include a connection identifier selection module 1226, a traffic transmission request generation module 1228, a request resource identification module 1230, a backlog tracking module 1231, a traffic type determination module 1232, a latency determination module 1233, and a traffic data signaling module 1234.

The connection identifier selection module 1226 includes a random selection module 1234, a highest priority selection module 1236 and a lower priority selection module 1238. At different times, a different type of the set of selection module (1234, 1236, 1238) is used to perform the selection for a particular traffic segment, e.g., due to different input conditions.

Data/information 1220 includes a plurality of sets of information pertaining to traffic segments in a recurring timing structure (traffic segment 1 information 1236, . . . , traffic segment K information 1238), a determined amount of traffic to be transmitted 1240, determined type of traffic to be transmitted information 1242, determined latency requirements 1244, a list of acquired connection identifiers 1246, a selected connection identifier 1248, an identified request resource 1250 and a generated traffic transmission request signal 1252.

Traffic segment 1 information 1236 includes a set of identifiers (identifiers 1 1254, . . . , identifier n 1256), resource information corresponding to the identifiers (identifier 1 request resource information 1258, . . . , identifier n request resource information 1260), respectively, corresponding identifier priority information (identifier 1 priority information 1262, . . . , identifier n priority information 1264), respectively, and traffic segment 1 resource information 1266. Traffic segment K information 1238 includes the set of identifiers (identifiers 1 1254, . . . , identifier n 1256), resource information corresponding to the identifiers (identifier 1 request resource information 1268, . . . , identifier n request resource information 1270), respectively, corresponding identifier priority information (identifier 1 priority information 1272, . . . , identifier n priority information 1086), respectively, and traffic segment K resource information 1276. In some embodiments, the priority associated with a particular identifier changes between different segments. For example, the priority identified by information 1262 may be different from the priority identified by information 1272, and the priority identified by information 1264 may be different from the priority identified by information 1274. In some such embodiments the average priority associated with each individual connection identifier is substantially the same, e.g., for one iteration of the recurring timing structure. Thus on a long term basis, in such an embodiment, no one connector identifier is favored over another connection identifier. In some other embodiments the priority associated with a connection identifier remains the same over the traffic segments in the recurring timing structure. For example, the priority indicated by information 1262 is the same as the priority indicated by information 1272, and the priority indicated by information 1264 is the same as the priority indicated by information 1274.

List of acquired connection identifiers 1246 is a list of connection identifiers acquired by communications device 1200 to be used corresponding to same connection with another device, e.g., a list of multiple connection identifiers corresponding to the same peer to peer connection with another communications device. In various embodiments, the list of acquired connection identifiers 1246 is acquired using a protocol implementing decentralized control in which handshake signaling occurs between communications device 1200 and the communications device with which the connection is established.

Connection identifier selection module 1226 selects a connection identifier to be used by communications device 1200, on a per traffic segment basis, from among the maintained list of acquired connection identifiers 1246. Selected connection identifier 1248 represents the output of connection identifier selection module 1226 for one traffic segment. Connection identifier selection module 1226 selects one of multiple connection identifiers to use at a point in time based on current traffic communications requirements for communications device 1200.

Traffic transmission request generation module 1228 generates a traffic transmission request, e.g., generated traffic transmission request signal 1252. Request resource identification module 1230 identifies a request resource, e.g., a dedicated traffic transmission request segment, corresponding to a selected connection identifier. For example, consider that the communications device 1200's current list of acquired connection identifiers 1246 includes identifier 1 1254 and identifier n 1256, that the communications device 1200 wants to transmit traffic in traffic segment 1 and that the connection identifier selection module 1226 has selected to use connection identifier n 1256 to carry the traffic transmission request signal and has stored its selection in information 1248. Then the request resource identification module 1230 identifies the request resource indicated by information 1260 to be used and stores information identifying that request resource as identified request resource information 1250. Wireless transmitter module 1204 transmits the generated traffic transmission request signal 1252 using the identified request resource 1250 corresponding to the selected connection identifier 1248.

Backlog tracking module 1231 tracks the amount of traffic waiting in its queue to be transmitted over the connection. Determined amount of traffic to be transmitted 1240, e.g., a bit count, a frame count, or packet count, is an output of backlog tracking module 1231 and is used as an input to connection identifier selection module 1226, which at times, performs a connection identifier selection for a traffic segment, as a function of backlog information. In some embodiments, different backlog counts are maintained corresponding to different types of traffic.

Traffic type determination module 1232 determines the type of traffic to be transmitted at a given point in time. Determined type of traffic to be transmitted 1242 is an output of module 1232 and is used as an input by module 1226. The connection identifier selection module 1226, at times, selects the connection identifier based on the type of traffic to be transmitted at a given point in time. In various embodiments, the traffic type determination module 1232 classifies traffic into categories including non-voice data and voice data, and the connection identifier selection module 1226 selects a connection identifier from the list of acquired connection identifiers having a lower priority when non-voice data is to be transmitted than when voice data is to be transmitted. In such an example, the connection identifier selection module 1226 uses its lower priority selection module 1238 to make the selection.

In some embodiments, when the only non-voice data is to be transmitted, e.g., in the traffic segment of interest, then the connection identifier is selected randomly from among the list of acquired connection identifiers. In such an example, the random selection module 1234 of connection identifier selection module 1234 is used to make the selection.

In some embodiments, when voice data is to be transmitted, e.g., in the traffic segment of interest, then the connection identifier having the highest priority among the connection identifiers in the list of acquired connection identifiers, is selected. In such a case, the highest priority selection module 1236 of the connection identifier selection module 1226 makes the selection.

Latency determination module 1233 determines latency requirements for queued traffic waiting to be transmitted and/or for traffic anticipated to be transmitted. Determined latency requirements 1244 is an output of module 1233 and an input for module 1226. In various embodiments, the connection identifier selection module 1226 considers determined latency requirements 1244 when selecting one the multiple connection identifiers in the list of acquired connection identifiers 1246.

In some embodiments, when voice data is to be communicated in the traffic segment of interest, but the latency requirements indicate that immediate transmission is not required, the connection identifier selection module 1226 uses the lower priority selection module 1238 to select a connection identifier having a lower priority than another connection identifier assigned to the communications device as identified by information 1246. Thus in such a situation, by selecting a lower priority connection identifier, the communications device 1200 is intentionally reducing its likelihood that it will be able to use the traffic segment. However, it is increasing the likelihood that another connection, e.g. a more urgent connection, may be able to use the traffic segment.

Traffic data signaling module 1234 generates traffic signals, e.g., peer to peer traffic signals, and controls the wireless transmitter module 1204 to transmit the generated traffic signals on the appropriate traffic segment resource corresponding to the transmitted request signal which was preciously transmitted and for which an affirmative communications request response signal was received. Traffic data signaling module 1234 also controls the receive module 1202 to receive traffic signals on a traffic segment resource corresponding to a received communications request for which it had previously transmitted a positive communications request response signal, and then recovers traffic data from the receive signal, e.g., peer to peer traffic signals intended for communications device 1200.

Figure 13B:
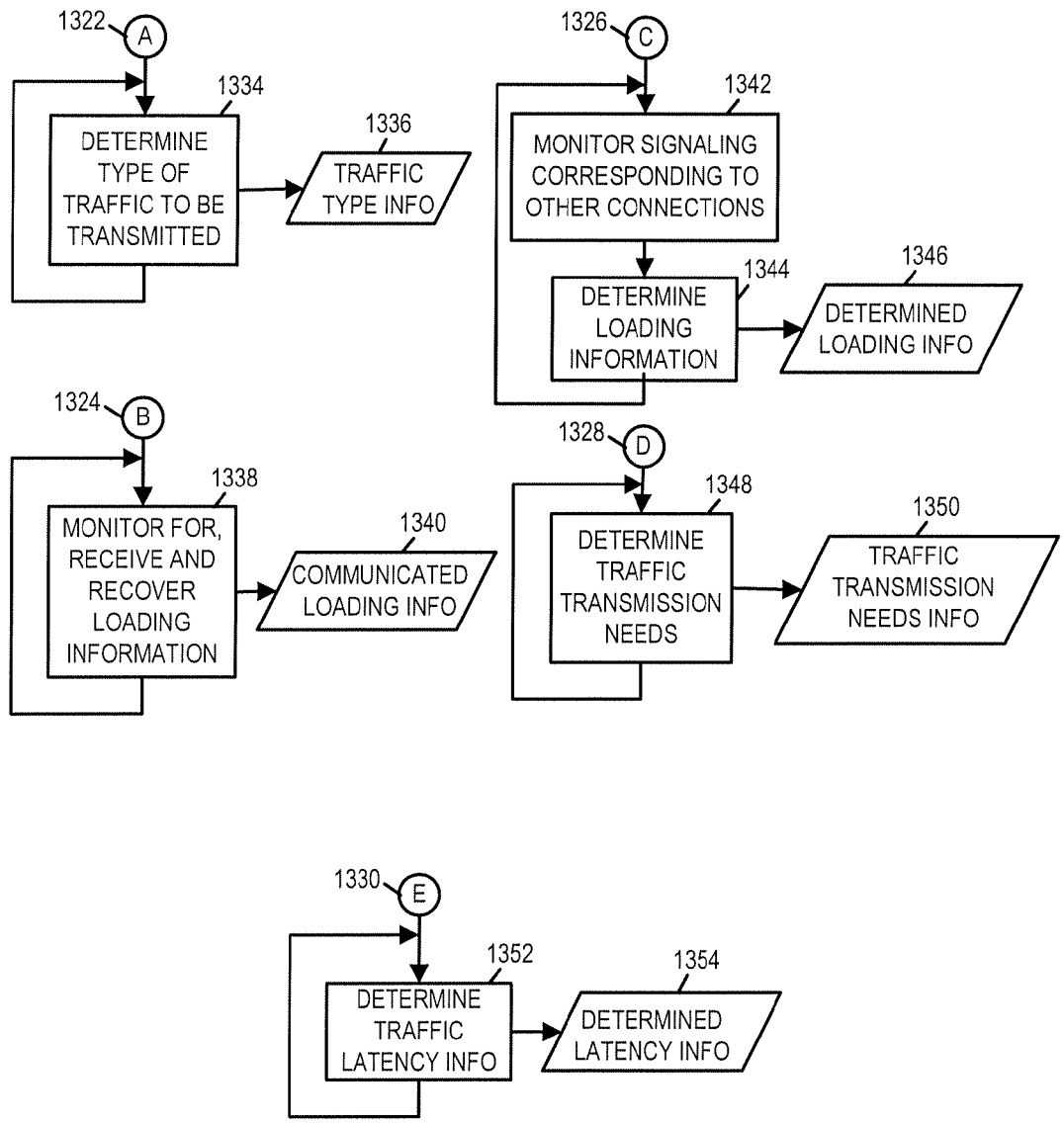
FIG. 13 comprising the combination of FIG. 13A, FIG. 13B and FIG. 13C, is a flowchart of an exemplary method of operating a communications device, e.g., a mobile wireless communications device supporting peer to peer communications, in accordance with an exemplary embodiment.
Figure 13C:
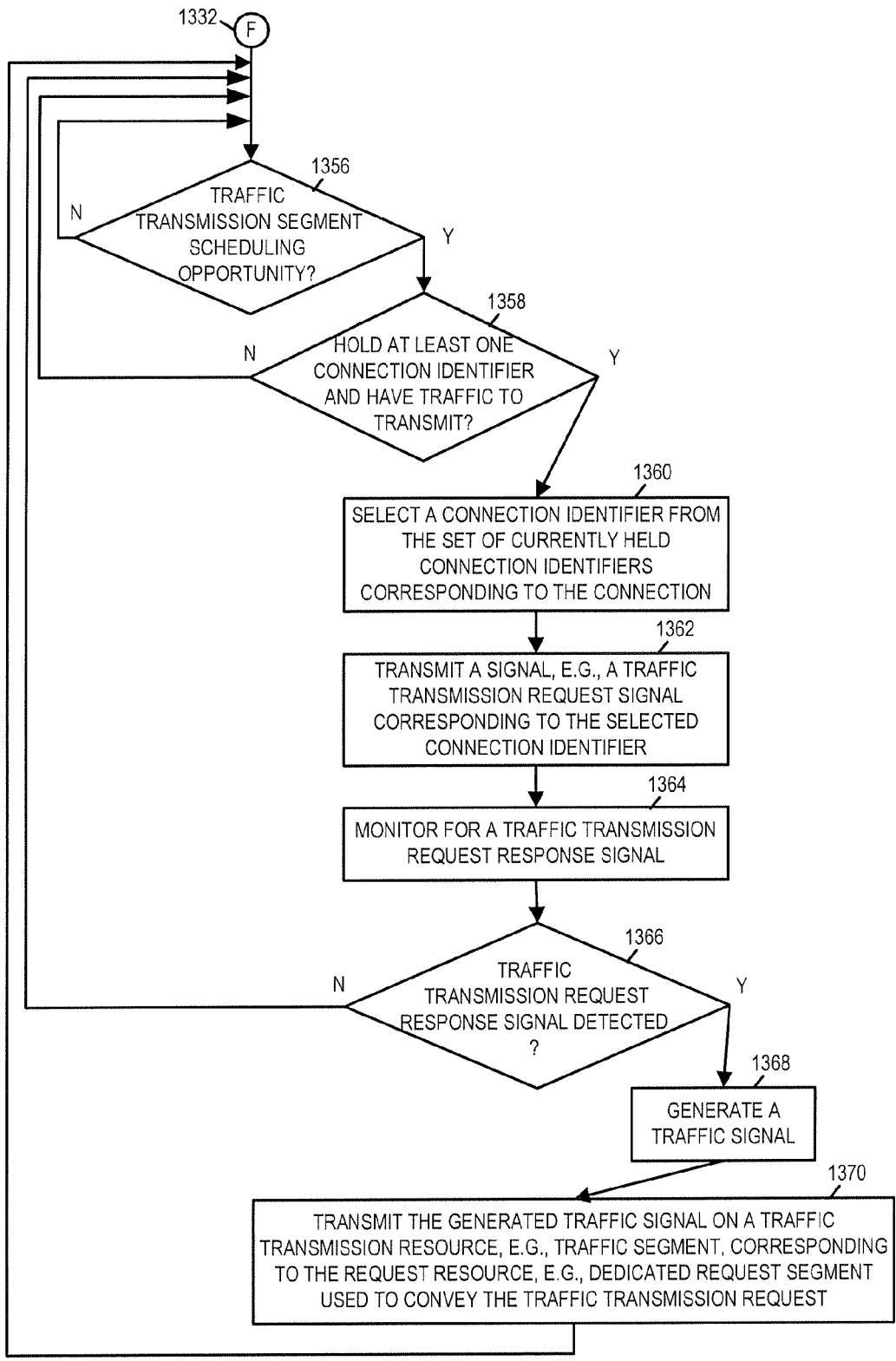

FIG. 13 comprising the combination of FIG. 13A, FIG. 13B and FIG. 13C, is a flowchart 1300 of an exemplary method of operating a communications device, e.g., a mobile wireless communications device supporting peer to peer communications, in accordance with an exemplary embodiment. The communications device is, e.g., communications device 1000 of FIG. 10. Operation of the exemplary method starts in step 1302 and proceeds to step 1304. In step 1304, the communications device stores information indicating: i) a correspondence between a set of identifiers and each of a plurality of traffic transmission resources which recur with time, the same set of identifiers corresponding to each of said plurality of traffic transmission resources; and ii) relative priorities of said identifiers with regard to individual traffic transmission resources, said information indicating for an individual identifier a variation of priority over time. For example, the plurality of traffic transmission resources which recur over time may be a plurality of indexed traffic transmission segments, e.g., peer to peer traffic transmission segments, in a timing/frequency structure. Continuing with the example, each identifier within the set of connection identifiers, for an individual traffic transmission segment, may correspond to a dedicated request resource for requesting to use the traffic transmission segment, and the different connection identifiers in the set of connection identifiers may be associated with different relative priorities. The priority associated with a single connection identifier may change from one traffic segment to another in the recurring timing/frequency structure. In various embodiments, the average priority provided to multiple different individual connection identifiers over time is substantially the same. In some embodiments, step 1304 is performed as part of a device configuration operation. In some embodiments, step 1304 is performed as part of an initialization operation. Operation proceeds from step 1304 to: step 1306, step 1334 via connecting node A 1332, step 1338 via connecting node B 1324, step 1342 via connecting node C 1326, step 1348 via connecting node D 1328, step 1352 via connecting node E 1330, and step 1356 via connecting node F 1332.

In step 1334, which is performed on an ongoing basis, the communications device determines the type of traffic to be transmitted. Traffic type information 1336 is an output of step 1336 which is used as an input to step 1308. Traffic type information is, e.g., information identifying traffic as voice traffic or non-voice traffic, or information identifying traffic as delay sensitive traffic or delay insensitive traffic.

In step 1338, which is performed on an ongoing basis, the communications device monitors for, receives and recovers loading information. Communicated loading information 1340 is an output of step 1338 which is used as an input to step 1308. In some embodiments, the loading information is communicated from a system node, e.g., fixed point node such as a base station. In some embodiments, the communicated loading information is an indicator signal indicating a level of traffic loading in the local region, e.g., one of a plurality of predetermined loading levels. In some embodiments, a loading information signal is only transmitted when loading exceeds a predetermined level. In some embodiments, a loading information signal is only transmitted when loading is below a predetermined level.

In step 1342 the communications device monitors signaling corresponding to other connections, e.g., peer to peer traffic signaling corresponding to other connections. Then in step 1344 the communications device determines loading information based on the detected monitored signaling. Determined loading information 1346, e.g., an estimate of future traffic transmission resource loading based on prior traffic transmission resource usage, is an output of step 1344 and an input to step 1308. Steps 1342 and 1344 are performed on an ongoing basis.

In various embodiments, for a given amount of data to be transmitted more identifiers are acquired during periods of high traffic loading than during periods of low traffic loading, the total amount of traffic to be transmitted in the local area during high traffic loading periods being greater than during low traffic loading periods.

In step 1348, which is performed on an ongoing basis, the communications device determines traffic transmission needs. Traffic transmission needs information 1350, e.g., information indicating an amount, e.g., number of frames or number of packets, of traffic waiting to be transmitted, is an output of step 1348 and an input to step 1308. At times, the communications device acquires an additional connection identifier in response to an increase in traffic transmission needs. At other times, the communications device relinquishes an acquired additional connection identifier in response to a decrease in traffic transmission needs.

In step 1352, which is performed on an ongoing basis, the communications device determines traffic latency information. Determined latency information 1354, e.g., information indicating how long delay sensitive traffic to be transmitted has been sitting in a transmission queue and/or information indicating time remaining to discard for delay sensitive traffic waiting to be transmitted. Determined latency information 1354 is an output of step 1352 and an input to step 1308. In some embodiments, for a given amount of data to be transmitted, more identifiers are acquired during periods of more stringent latency requirements than during periods of low latency requirements.

Returning to step 1306, in step 1306 the communications device checks if the current time corresponds to an opportunity in the recurring timing structure for the communications device to acquire connection identifiers. If the current time does not correspond to such an opportunity operation returns to the input of step 1306. However, if the current time does correspond to an opportunity for acquiring connection identifiers, then operation proceeds from step 1306 to step 1308.

In step 1308, the communications device determines the number of connection identifiers that the communications device desires to hold corresponding to a connection. Traffic type information 1336, communicated loading information 1340, determined loading information 1346, traffic transmission needs 1350, and latency information 1352 are inputs to the determination of step 1308. Operation proceeds from step 1308 to step 1310 and step 1312. In step 1310 the communications device determines the number of currently held connection identifiers to be relinquished. If any of the currently held connection identifiers are to be relinquished, then step 1314 is performed in which the communications device relinquishes the determined number of connection identifiers from step 1310. In step 1312, the communications device determines the number of additional connection identifiers to be acquired. If at least one additional connection identifier is to be acquired, then operation proceeds to step 1316. In step 1316, the communications device performs handshake signaling attempting to acquire the determined number of addition connection identifies, and in step 1318 the communications device acquires additional connection identifiers. Operation proceeds from steps 1314 and 1318 to step 1320, in which the communications device updates a list of currently held connection identifiers. Operation proceeds from step 1320 to the input of step 1306.

Returning to step 1356, in step 1356 the communications device determines whether the current time corresponds to a traffic transmission segment scheduling opportunity. If the current time does not correspond to a scheduling opportunity, then operation proceeds back to the input of step 1356. However, if the current time corresponds to a traffic transmission segment scheduling opportunity then operation proceeds from step 1356 to step 1358.

In step 1358 the communications device considers whether it holds at least connection identifier and has traffic to transmit. If the communications device holds at least one connection identifier and has traffic to transmit then operation proceeds from step 1358 to step 1360; otherwise operation proceeds from step 1358 to the input of step 1356.

Returning to step 1360, in step 1360 the communications device selects a connection identifier from the set of currently held connection identifiers corresponding to the connection. Then, in step 1362 the communications device transmits a signals, e.g., a traffic transmission request signal corresponding to the selected connection identifier. A dedicated request segment, dedicated to the selected connection identifier, is used to transmit the request signal. Operation proceeds from step 1362 to step 1364 in which the communications device monitors for a traffic transmission request response signal. Operation proceeds from step 1364 to step 1366. In step 1366 the communications device determines whether or not it has detected a traffic transmission request response signal in response to the transmitted request of step 1362. If a traffic transmission request response signal was not detected, then operation proceeds to the input of step 1356. However, if a traffic transmission request response signal was detected, representing a granting of the request, then operation proceeds from step 1366 to step 1368. In step 1368, the communications device generates a traffic signal, and in step 1370 the communications device transmits the generated traffic signal on a traffic transmission resource, e.g., a traffic segment, corresponding to the resource used to the transmit the request signal, e.g., corresponding to a dedicated request segment used to convey the traffic transmission request. Operation proceeds from step 1370 to the input of step 1356. A dedicated request segment is dedicated to the selected connection identifier, is used to transmit the request signal.

In some embodiments, the recurring timing structure is such that opportunities for acquiring identifiers are spaced at wider intervals than traffic transmission segment scheduling opportunities. In some embodiments, the recurring timing structure is such that in one iteration of the recurring timing structure, there are more individual traffic transmission segments for which the communications device can request usage than there are opportunities for requesting acquisition of connection identifiers. Thus in some embodiments, the communications device maintains and holds an acquired set of connection identifiers corresponding to a single connection, e.g., a single peer to peer connection, for the duration of multiple traffic transmission segment scheduling opportunities.

Figure 14:
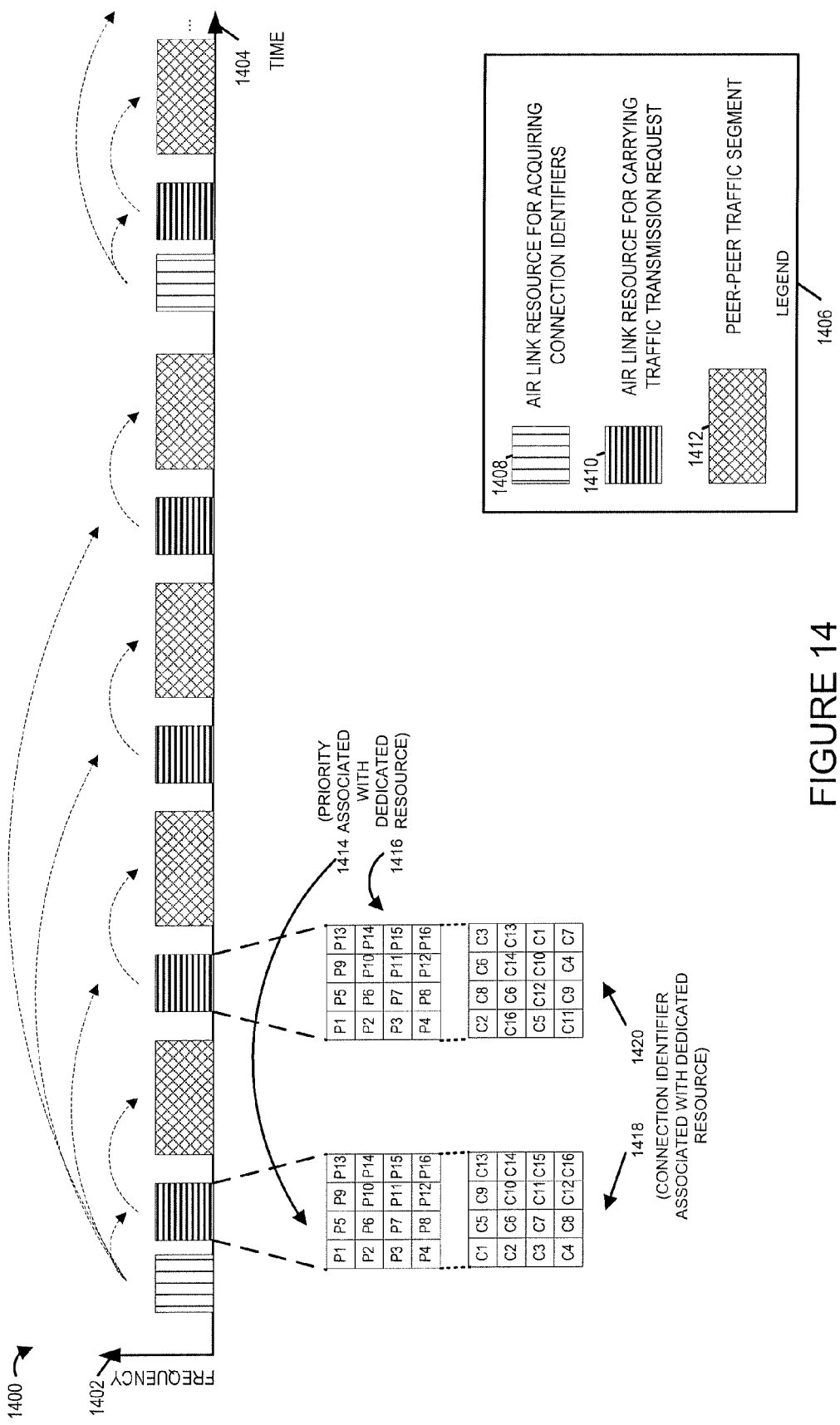
FIG. 14 is a drawing illustrating an exemplary recurring peer to peer timing structure used in some embodiments.

FIG. 14 is a drawing illustrating an exemplary recurring peer to peer timing structure used in some embodiments. The exemplary structure of FIG. 14 is used, e.g., in a method in accordance with flowchart 900 of FIG. 9, flowchart 1100 of FIG. 11, or flowchart 1300 of FIG. 13, or in a communications device 1000 of FIG. 10 or communications device 1200 of FIG. 12. FIG. 14 includes an air link resources' frequency vs time plot 1400. Plot 1400 includes a vertical axis 1402 representing frequency, e.g., OFDM tones, and a horizontal axis 1404 representing time, e.g., OFDM symbol transmission time intervals in a recurring timing structure. Legend 1406 identifies that: blocks of type 1408 with vertical line shading represent air link resources used for acquiring connection identifiers; blocks of type 1410 with horizontal line shading represent air link resources for carrying traffic transmission request signals; and blocks of type 1412 with crosshatch shading represent peer to peer traffic segments.

Each air link resource for acquiring connection identifiers of type 1408 is associated with a plurality of successive air link resources of type 1410 for carrying traffic transmission requests. Each air link resource for carrying traffic transmission requests of type 1410 is associated with a corresponding peer to peer traffic segment of type 1412. A peer to peer connection between two wireless terminals may acquire one or more connection identifiers during a connection identifier acquisition interval and hold a fixed set of acquired connection identifiers until the next connection identifier acquisition interval. A connection may be, and sometimes is, associated with multiple connection identifiers concurrently. When multiple requests to use the same traffic segment occur and concurrent use of the same segment is expected to result in unacceptable interference, priority information is used in determining which connection is allowed to use the traffic transmission segment, with the traffic segment under contention going to the requesting connection having a connection identifier associated with the highest priority from among those in contention.

In this example, each air link resource for carrying traffic transmission requests of type 1410 is partitioned into a plurality of individual dedicated resources, each individual resource having a unique priority level and being associated with one connection identifier. Information 1414 identifies the priorities associated with 16 dedicated resources corresponding to a first resource of type 1410, while information 1416 identifies the priorities associated with 16 dedicated resources corresponding to a second resource of type 1410. Information 1418 identifies the connection identifiers associated with the 16 dedicated resources corresponding to the first resource of type 1410, while information 1420 identifies the connection identifiers associated with the 16 dedicated resources corresponding to the second resource of type 1410. In this example it may observed that the priority associated with an individual connection identifier changes over time. In one embodiment, each of the different connection identifiers has substantially the same average priority over an iteration of the recurring timing structure.

Figure 15:
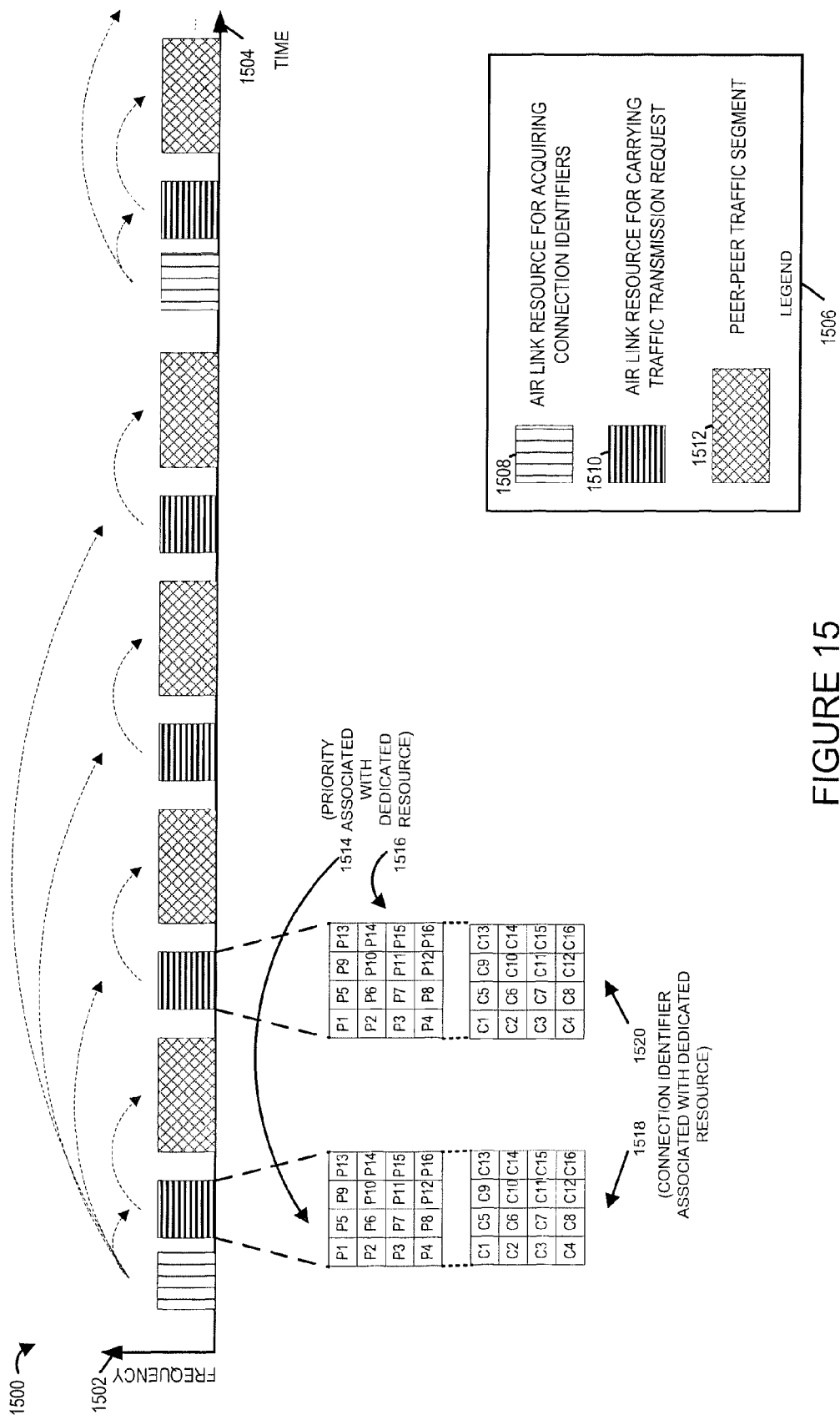
FIG. 15 is a drawing illustrating an exemplary recurring peer to peer timing structure used in some embodiments.

FIG. 15 is a drawing illustrating an exemplary recurring peer to peer timing structure used in some embodiments. The exemplary structure of FIG. 15 is used, e.g., in a method in accordance with flowchart 1100 of FIG. 11 or communications device 1200 of FIG. 12. FIG. 15 includes an air link resources' frequency vs time plot 1500. Plot 1500 includes a vertical axis 1502 representing frequency, e.g., OFDM tones, and a horizontal axis 1504 representing time, e.g., OFDM symbol transmission time intervals in a recurring timing structure. Legend 1506 identifies that: blocks of type 1508 with vertical line shading represent air link resources used for acquiring connection identifiers; blocks of type 1510 with horizontal line shading represent air link resources for carrying traffic transmission request signals; and blocks of type 1512 with crosshatch shading represent peer to peer traffic segments.

Each air link resource for acquiring connection identifiers of type 1508 is associated with a plurality of successive air link resources of type 1510 for carrying traffic transmission requests. Each air link resource for carrying traffic transmission requests of type 1510 is associated with a corresponding peer to peer traffic segment of type 1512. A peer to peer connection between two wireless terminals may acquire one or more connection identifiers during a connection identifier acquisition interval and hold a fixed set of acquired connection identifiers until the next connection identifier acquisition interval. A connection may be, and sometimes is, associated with multiple connection identifiers concurrently. When multiple requests to use the same traffic segment occur and concurrent use of the same segment is expected to result in unacceptable interference, priority information is used in determining which connection is allowed to use the traffic transmission segment, with the traffic segment under contention going to the requesting connection having a connection identifier associated with the highest priority from among those in contention.

In this example, each air link resource for carrying traffic transmission requests of type 1510 is partitioned into a plurality of individual dedicated resources, each individual resource having a unique priority level and being associated with one connection identifier. Information 1514 identifies the priorities associated with 16 dedicated resources corresponding to a first resource of type 1510, while information 1516 identifies the priorities associated with 16 dedicated resources corresponding to a second resource of type 1510. Information 1518 identifies the connection identifiers associated with the 16 dedicated resources corresponding to the first resource of type 1510, while information 1520 identifies the connection identifiers associated with the 16 dedicated resources corresponding to the second resource of type 1510. In this example, it may be observed that the priority associated with a particular connection identifier remains the same.

Figure 16:
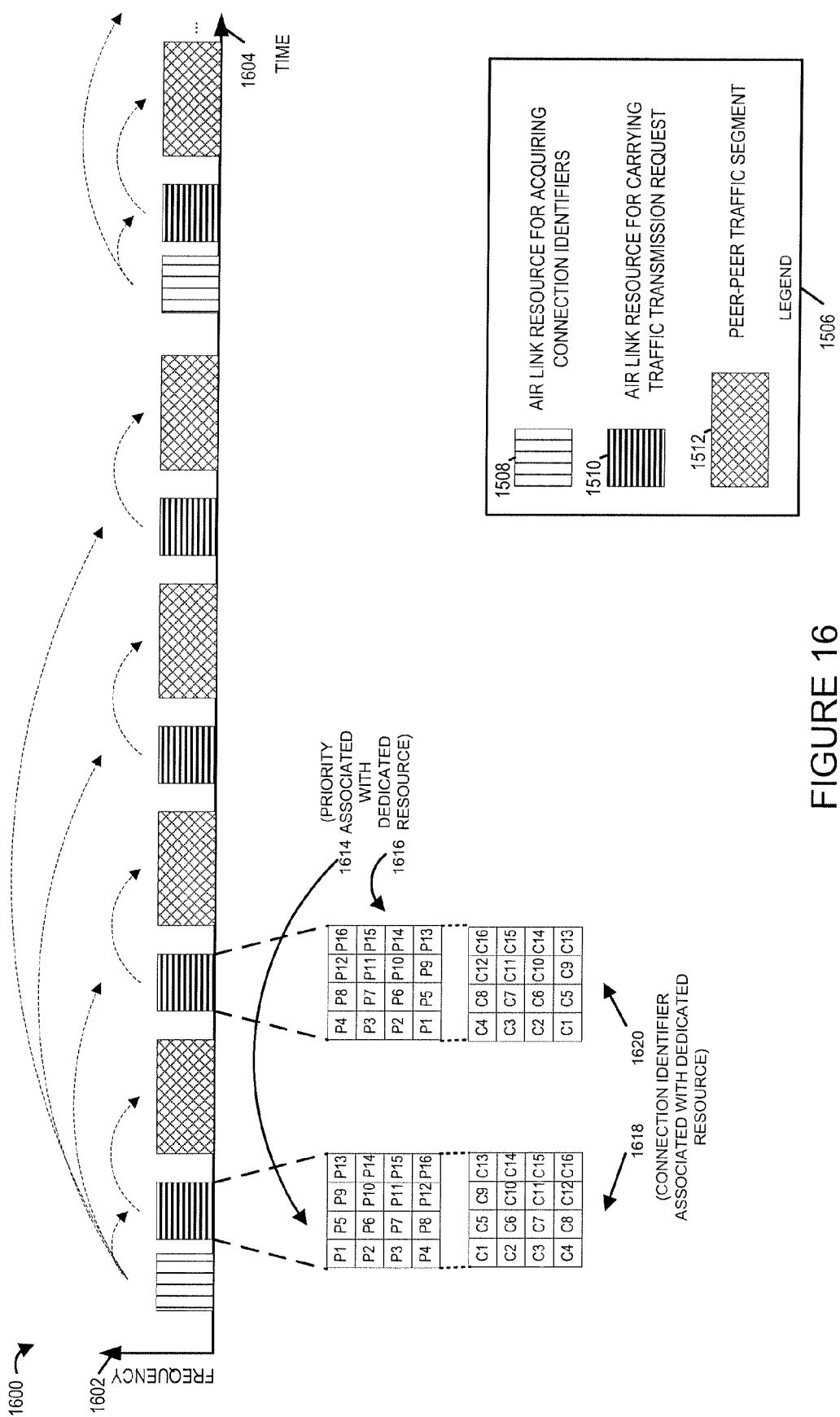
FIG. 16 is a drawing illustrating an exemplary recurring peer to peer timing structure used in some embodiments.

FIG. 16 is a drawing illustrating an exemplary recurring peer to peer timing structure used in some embodiments. The exemplary structure of FIG. 16 is used, e.g., in a method in accordance with flowchart 1100 of FIG. 11 or communications device 1200 of FIG. 12. FIG. 16 includes an air link resources' frequency vs time plot 1600. Plot 1600 includes a vertical axis 1602 representing frequency, e.g., OFDM tones, and a horizontal axis 1604 representing time, e.g., OFDM symbol transmission time intervals in a recurring timing structure. Legend 1606 identifies that: blocks of type 1608 with vertical line shading represent air link resources used for acquiring connection identifiers; blocks of type 1610 with horizontal line shading represent air link resources for carrying traffic transmission request signals; and blocks of type 1612 with crosshatch shading represent peer to peer traffic segments.

Each air link resource for acquiring connection identifiers of type 1608 is associated with a plurality of successive air link resources of type 1610 for carrying traffic transmission requests. Each air link resource for carrying traffic transmission requests of type 1610 is associated with a corresponding peer to peer traffic segment of type 1612. A peer to peer connection between two wireless terminals may acquire one or more connection identifiers during a connection identifier acquisition interval and hold a fixed set of acquired connection identifiers until the next connection identifier acquisition interval. A connection may be, and sometimes is, associated with multiple connection identifiers concurrently. When multiple requests to use the same traffic segment occur and concurrent use of the same segment is expected to result in unacceptable interference, priority information is used in determining which connection is allowed to use the traffic transmission segment, with the traffic segment under contention going to the requesting connection having a connection identifier associated with the highest priority from among those in contention.

In this example, each air link resource for carrying traffic transmission requests of type 1610 is partitioned into a plurality of individual dedicated resources, each individual resource having a unique priority level and being associated with one connection identifier. Information 1614 identifies the priorities associated with 16 dedicated resources corresponding to a first resource of type 1610, while information 1616 identifies the priorities associated with 16 dedicated resources corresponding to a second resource of type 1610. Information 1618 identifies the connection identifiers associated with the 16 dedicated resources corresponding to the first resource of type 1610, while information 1620 identifies the connection identifiers associated with the 16 dedicated resources corresponding to the second resource of type 1610. In this example, it may be observed that the priority associated with a particular connection identifier remains the same; however, the particular dedicated resource, e.g., OFDM tone-symbol, associated with the connection identifier, changes from one request resource block to the next.

The techniques of various embodiments may be implemented using software, hardware and/or a combination of software and hardware. Various embodiments are directed to apparatus, e.g., mobile nodes such as mobile terminals, base stations, communications system. Various embodiments are also directed to methods, e.g., method of controlling and/or operating mobile nodes, base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method.

In various embodiments nodes described herein are implemented using one or more modules to perform the steps corresponding to one or more methods, for example, storing, determining, acquiring, requesting, selecting, signal processing, a decision step, message generation, message signaling, switching, reception and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s). Some embodiments are directed to a device, e.g., communications device, including a processor configured to implement one, multiple or all of the steps of one or more methods of the invention.

In some embodiments, the processor or processors, e.g., CPUs, of one or more devices, e.g., communications devices such as wireless terminals are configured to perform the steps of the methods described as being as being performed by the communications device. Accordingly, some but not all embodiments are directed to a device, e.g., communications device, with a processor which includes a module corresponding to each of the steps of the various described methods performed by the device in which the processor is included. In some but not all embodiments a device, e.g., communications device, includes a module corresponding to each of the steps of the various described methods performed by the device in which the processor is included. The modules may be implemented using software and/or hardware.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods.

What is claimed is:

1. A method of operating a communications device, comprising:
    storing information indicating:
        i) a correspondence between a set of identifiers and each of a plurality of traffic transmission resources which recur with time, the same set of identifiers corresponding to each of said plurality of traffic transmission resources; and
        ii) relative priorities of said identifiers with regard to individual traffic transmission resources, said information indicating for an individual identifier a variation in priority over time; and
    transmitting a communication request signal corresponding to one of said connection identifiers, said one of said connection identifiers corresponding to said communications device wherein the average priority provided to multiple different individual identifiers over time is substantially the same.

2. The method of claim 1, further comprising, prior to transmitting said signal, acquiring the right to use multiple identifiers.

3. The method of claim 2, wherein acquiring the right to use multiple identifiers includes acquiring different numbers of identifiers at different points in time.

4. The method of claim 3, further comprising:
    acquiring an additional identifier in response to an increase in traffic transmission needs.

5. The method of claim 4, further comprising:
    relinquishing the acquired additional identifier in response to a decrease in traffic transmission needs.

6. The method of claim 5, further comprising: determining the number of identifiers to be acquired as a function of current local traffic loading.

7. The method of claim 6, where for a given amount of data to be transmitted more identifiers are acquired during periods of high traffic loading than during periods of low traffic loading, the total amount of data transmitted in the local area during high traffic loading periods being greater than during low traffic loading periods.

8. The method of claim 6, where for a given amount of data to be transmitted more identifiers are acquired during periods of more stringent latency requirements than during periods of low latency requirements.

9. The method of claim 3, further comprising:
    determining, when data is to be transmitted, the number of identifiers to be acquired as a function of the type of traffic data to be transmitted.

10. A communications device, comprising:
    a memory including stored information indicating:
        i) a correspondence between a set of identifiers and each of a plurality of traffic transmission resources which recur with time, the same set of identifiers corresponding to each of said plurality of traffic transmission resources; and
        ii) relative priorities of said identifiers with regard to individual traffic transmission resources, said information indicating for an individual identifier a variation in priority over time;
    a wireless transmitter module for transmitting a communication request signal corresponding to one of said connection identifiers, said one of said connection identifiers corresponding to said communications device wherein the average priority provided to multiple different individual identifiers over time is substantially the same.

11. The communications device of claim 10, further comprising:
    an identifier acquisition module for acquiring the right to use identifiers, and wherein the identifier acquisition module supports acquiring the right to use multiple identifiers.

12. The communications device of claim 11, wherein said identifier acquisition module is for acquiring the right to use different numbers of identifiers at different points in time.

13. The communications device of claim 12, further comprising
    a traffic transmission requirement module for determining the communications device's traffic transmission needs, and wherein the identifier acquisition module includes an identifier add-on module for acquiring an additional identifier in response to an increase in traffic transmission needs.

14. The communications device of claim 13, wherein the identifier acquisition module further comprises:
an identifier relinquishing module for relinquishing an acquired identifier in response to a decrease in traffic transmission needs.

15. The communications device of claim 14, further comprising:
a traffic loading module for determining current local traffic loading, and wherein the identifier acquisition module determines the number of identifiers to be acquired as a function of current local traffic loading.

16. The communications device of claim 15, where for a given amount of data to be transmitted more identifiers are acquired during periods of high traffic loading than during periods of low traffic loading, the total amount of data transmitted in the local area during high traffic loading periods being greater than during low traffic loading periods.

17. The communications device of claim 15, where for a given amount of data to be transmitted more identifiers are acquired during periods of more stringent latency requirements than during periods of low latency requirements.

18. The communications device of claim 12, further comprising: a traffic data type determination module for determining the type of traffic data to be transmitted, and wherein the identifier acquisition module determines the number of identifiers to be acquired as a function of the type of traffic data to be transmitted.

19. A communications device, comprising:
storage means including stored information indicating:
i) a correspondence between a set of identifiers and each of a plurality of traffic transmission resources which recur with time, the same set of identifiers corresponding to each of said plurality of traffic transmission resources; and
ii) relative priorities of said identifiers with regard to individual traffic transmission resources, said information indicating for an individual identifier a variation in priority over time; and
wireless transmitter means for transmitting a communications request signal corresponding to one of said connection identifiers, said one of said connection identifiers corresponding to said communications device wherein the average priority provided to multiple different individual identifiers over time is substantially the same.

20. A computer program product for use in a communications device, comprising:
a non-transitory computer-readable medium comprising:
code for causing a computer to store information indicating:
i) a correspondence between a set of identifiers and each of a plurality of traffic transmission resources which recur with time, the same set of identifiers corresponding to each of said plurality of traffic transmission resources; and
ii) relative priorities of said identifiers with regard to individual traffic transmission resources, said information indicating for an individual identifier a variation in priority over time; and
code for causing a computer to transmit a communication request signal corresponding to one of said connection identifiers, said one of said connection identifiers corresponding to said communications device wherein the average priority provided to multiple different individual identifiers over time is substantially the same.

21. An apparatus comprising:
a processor configured to control a communications device to:
store information indicating:
i) a correspondence between a set of identifiers and each of a plurality of traffic transmission resources which recur with time, the same set of identifiers corresponding to each of said plurality of traffic transmission resources; and
ii) relative priorities of said identifiers with regard to individual traffic transmission resources, said information indicating for an individual identifier a variation in priority over time; and
transmit a communication request signal corresponding to one of said connection identifiers, said one of said connection identifiers corresponding to said communications device wherein the average priority provided to multiple different individual identifiers over time is substantially the same.

* * * * *